US012432286B1

(12) United States Patent
Cannata et al.

(10) Patent No.: US 12,432,286 B1
(45) Date of Patent: *Sep. 30, 2025

(54) MULTI-PROTOCOL COMMUNICATION FABRIC CONTROL

(71) Applicant: Liqid Inc., Broomfield, CO (US)

(72) Inventors: James Scott Cannata, Denver, CO (US); Phillip Clark, Boulder, CO (US); Bryan Nagel, Denver, CO (US); Henry Lee Harris, Redding, CA (US); Bryan Schramm, Broomfield, CO (US); Sumit Puri, Calabasas, CA (US)

(73) Assignee: Liqid Inc., Westminster, CO (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/607,887

(22) Filed: Mar. 18, 2024

Related U.S. Application Data

(63) Continuation of application No. 16/858,005, filed on Apr. 24, 2020, now Pat. No. 11,973,650.

(60) Provisional application No. 62/934,703, filed on Nov. 13, 2019, provisional application No. 62/838,504, filed on Apr. 25, 2019.

(51) Int. Cl.
*G06F 15/177* (2006.01)
*H04L 41/0894* (2022.01)
*H04L 69/08* (2022.01)
*H04L 69/18* (2022.01)

(52) U.S. Cl.
CPC .......... *H04L 69/08* (2013.01); *H04L 41/0894* (2022.05); *H04L 69/18* (2013.01)

(58) Field of Classification Search
None
See application file for complete search history.

(56) References Cited

U.S. PATENT DOCUMENTS

| 652,266 A | 6/1900 | Herr |
|---|---|---|
| 678,579 A | 7/1901 | Mauk |

(Continued)

FOREIGN PATENT DOCUMENTS

| JP | 2004046372 A | 2/2004 |
|---|---|---|
| WO | 2002065322 A1 | 8/2002 |

(Continued)

OTHER PUBLICATIONS

Extended European Search Report for EP Application No. 21904088.8, mailed Mar. 13, 2024; 12 pages.

(Continued)

*Primary Examiner* — Wing F Chan
*Assistant Examiner* — Andrew Woo

(57) ABSTRACT

Deployment of arrangements of computing components coupled over a communication fabric are presented herein. In one example, a method includes detecting first computing components communicatively coupled to a first communication fabric having a first communication fabric type, and detecting second computing components communicatively coupled to a second communication fabric having a second communication fabric type. The method also includes receiving user commands to form compute units among a pool of computing components comprising the first computing components and the second computing components. Based at least on the user commands, the method includes forming the compute units for use by one or more users.

20 Claims, 14 Drawing Sheets

(56) References Cited

U.S. PATENT DOCUMENTS

| | | |
|---|---|---|
| 685,261 A | 10/1901 | Crane |
| 5,828,207 A | 10/1998 | Saadeh |
| 6,061,750 A | 5/2000 | Beardsley et al. |
| 6,208,345 B1 | 3/2001 | Sheard et al. |
| 6,325,636 B1 | 12/2001 | Hipp et al. |
| 7,243,145 B1 | 7/2007 | Poortman |
| 7,260,487 B2 | 8/2007 | Brey et al. |
| 7,340,578 B1 | 3/2008 | Khanzode |
| 7,505,889 B2 | 3/2009 | Salmonsen et al. |
| 7,606,960 B2 | 10/2009 | Munguia |
| 7,685,261 B1 | 3/2010 | Scammell et al. |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,223,634 B2 | 12/2015 | Chang et al. |
| 9,270,489 B1 | 2/2016 | Wells et al. |
| 9,602,437 B1 | 3/2017 | Bernath |
| 9,891,984 B1 | 2/2018 | Hayward |
| 10,372,362 B2 | 8/2019 | Guim Bernat et al. |
| 10,382,279 B2 | 8/2019 | Roese et al. |
| 10,536,349 B1 | 1/2020 | Hayward |
| 10,652,266 B1 | 5/2020 | Tautschnig et al. |
| 10,678,579 B2 | 6/2020 | Rivera et al. |
| 10,999,403 B2 | 5/2021 | Watt et al. |
| 11,210,133 B1 | 12/2021 | Barker et al. |
| 11,281,498 B1 | 3/2022 | Kinney et al. |
| 11,949,559 B2 | 4/2024 | Cannata et al. |
| 11,973,650 B2 | 4/2024 | Cannata et al. |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0188191 A1 | 8/2005 | Yoshida et al. |
| 2005/0223136 A1 | 10/2005 | Tanaka et al. |
| 2006/0259810 A1 | 11/2006 | Hosoya et al. |
| 2006/0277206 A1 | 12/2006 | Bailey et al. |
| 2007/0067432 A1 | 3/2007 | Tarui et al. |
| 2007/0067481 A1 | 3/2007 | Sharma et al. |
| 2008/0034153 A1 | 2/2008 | Lee et al. |
| 2008/0123559 A1 | 5/2008 | Haviv et al. |
| 2008/0155100 A1 | 6/2008 | Ahmed et al. |
| 2008/0198744 A1 | 8/2008 | Menth |
| 2008/0281938 A1 | 11/2008 | Rai et al. |
| 2008/0320121 A1 | 12/2008 | Altaf et al. |
| 2009/0006837 A1 | 1/2009 | Rothman et al. |
| 2009/0100280 A1 | 4/2009 | Lindsay |
| 2009/0132699 A1 | 5/2009 | Sharma et al. |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2009/0276773 A1 | 11/2009 | Brown et al. |
| 2010/0049851 A1 | 2/2010 | Garrison et al. |
| 2010/0088467 A1 | 4/2010 | Lee et al. |
| 2010/0100655 A1 | 4/2010 | Dowedeit |
| 2010/0138768 A1 | 6/2010 | Lonkar et al. |
| 2010/0153965 A1 | 6/2010 | Arimilli et al. |
| 2011/0119423 A1 | 5/2011 | Kishore et al. |
| 2011/0154101 A1 | 6/2011 | Van Der Merwe et al. |
| 2011/0289510 A1 | 11/2011 | Lin et al. |
| 2011/0299317 A1 | 12/2011 | Shaeffer et al. |
| 2011/0302349 A1 | 12/2011 | Griggs |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0254597 A1 | 10/2012 | Delling et al. |
| 2012/0311154 A1 | 12/2012 | Morgan |
| 2012/0317433 A1 | 12/2012 | Ellis et al. |
| 2013/0132643 A1 | 5/2013 | Huang |
| 2013/0159910 A1 | 6/2013 | Bostic et al. |
| 2013/0185416 A1 | 7/2013 | Larkin et al. |
| 2013/0204933 A1 | 8/2013 | Cardona et al. |
| 2013/0223438 A1 | 8/2013 | Tripathi et al. |
| 2013/0291052 A1 | 10/2013 | Hadar |
| 2013/0297845 A1 | 11/2013 | Ziakas et al. |
| 2013/0346994 A1 | 12/2013 | Chen et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0181825 A1 | 6/2014 | He et al. |
| 2014/0365714 A1 | 12/2014 | Sweere et al. |
| 2015/0026385 A1 | 1/2015 | Egi et al. |
| 2015/0052282 A1 | 2/2015 | Dong |
| 2015/0074322 A1 | 3/2015 | Galles |
| 2015/0103826 A1 | 4/2015 | Davis |
| 2015/0120479 A1 | 4/2015 | Bastien et al. |
| 2015/0121115 A1 | 4/2015 | Chandra et al. |
| 2015/0128245 A1 | 5/2015 | Brown et al. |
| 2015/0186437 A1 | 7/2015 | Molaro |
| 2015/0212755 A1 | 7/2015 | Asnaashari |
| 2015/0254088 A1 | 9/2015 | Chou et al. |
| 2015/0271010 A1 | 9/2015 | Shetty et al. |
| 2015/0304423 A1 | 10/2015 | Satoyama et al. |
| 2015/0373115 A1 | 12/2015 | Breakstone et al. |
| 2016/0188365 A1 | 6/2016 | Bodas et al. |
| 2016/0197996 A1 | 7/2016 | Barton et al. |
| 2016/0248631 A1 | 8/2016 | Duchesneau |
| 2017/0054603 A1 | 2/2017 | Kulkarni et al. |
| 2017/0118115 A1* | 4/2017 | Tsuji ............... H04L 69/22 |
| 2017/0255584 A1* | 9/2017 | Oh ............... H04L 69/16 |
| 2018/0004703 A1 | 1/2018 | Sharma et al. |
| 2018/0034908 A1 | 2/2018 | Li |
| 2018/0046338 A1 | 2/2018 | Breakstone et al. |
| 2018/0046509 A1 | 2/2018 | Arata et al. |
| 2018/0046514 A1 | 2/2018 | Breakstone et al. |
| 2018/0069899 A1 | 3/2018 | Lang et al. |
| 2018/0152373 A1 | 5/2018 | Logue et al. |
| 2018/0188974 A1 | 7/2018 | Cayton et al. |
| 2018/0213369 A1 | 7/2018 | Dong et al. |
| 2018/0248949 A1 | 8/2018 | Siddappa et al. |
| 2018/0285009 A1 | 10/2018 | Guim Bernat et al. |
| 2018/0322081 A1 | 11/2018 | Breakstone et al. |
| 2018/0341619 A1 | 11/2018 | Slik |
| 2019/0034367 A1 | 1/2019 | Kakaiya et al. |
| 2019/0050261 A1 | 2/2019 | Schmisseur et al. |
| 2019/0108158 A1 | 4/2019 | Kachare et al. |
| 2019/0324820 A1 | 10/2019 | Krishnan et al. |
| 2020/0028800 A1 | 1/2020 | Strathman et al. |
| 2020/0067769 A1 | 2/2020 | Dixon et al. |
| 2020/0133876 A1 | 4/2020 | Bielski et al. |
| 2020/0174838 A1 | 6/2020 | Li et al. |
| 2020/0218678 A1 | 7/2020 | Prabhakar et al. |
| 2020/0241926 A1 | 7/2020 | Guim Bernat |
| 2020/0250787 A1 | 8/2020 | Cheng et al. |
| 2020/0341930 A1 | 10/2020 | Cannata et al. |
| 2020/0344125 A1 | 10/2020 | Cannata et al. |

FOREIGN PATENT DOCUMENTS

| | | |
|---|---|---|
| WO | 2007146368 A2 | 12/2007 |
| WO | 2016196766 A2 | 12/2016 |

OTHER PUBLICATIONS

Aragon, Juan L. et al., "Control Speculation For Energy-Efficient Next-Generation Superscalar Processors," IEEE Transactions on Computers, vol. 55, No. 3, pp. 281-291, Mar. 2006.

Extended European Search Report for EP Application No. 20794234.3, mailed Jan. 2, 2023; 14 pages.

Extended European Search Report for EP Application No. 20794977.7, mailed Nov. 18, 2022; 18 pages.

Extended European Search Report for EP Application No. 20795595.6, mailed Nov. 16, 2022; 11 pages.

(56) References Cited

OTHER PUBLICATIONS

Extended European Search Report for EP Application No. 20796151.7, mailed Dec. 19, 2022; 9 pages.
International Application No. PCT/US2017/046602, International Search Report & Written Opinion, 8 pages, Oct. 19, 2017.
International Application No. PCT/US2017/046607, International Search Report & Written Opinion, 7 pages, Oct. 23, 2017.
International Application No. PCT/US2020/029709, International Search Report & Written Opinion, 14 pages, Jul. 17, 2020.
International Application No. PCT/US2020/029716, International Search Report & Written Opinion, 14 pages, Jul. 2, 2020.
International Search Report and Written Opinion for PCT Application No. PCT/US2022/016993 which was filed Feb. 18, 2022; mailed Jun. 28, 2022; 9 pages.
Lu, Yingping et al., "Performance Study Of iSCSI-Based Storage Subsystems," IEEE Communications Magazine, pp. 76-82, Aug. 2003.
Mehta et al.; "A model-driven approach to job/task compositions in cluster computing;" 2007 IEEE International Parallel and Distributed Processing Symposium, IEEE, 2007, Mar. 26, 2007 (Abstract).

\* cited by examiner

MULTI-PROTOCOL COMMUNICATION FABRIC CONTROL

RELATED APPLICATIONS

This application is a continuation of, and claims priority to, U.S. patent application Ser. No. 16/858,005, entitled "MULTI-PROTOCOL COMMUNICATION FABRIC CONTROL," and filed Apr. 24, 2020. This application hereby claims the benefit of and priority to U.S. Provisional Patent Application 62/838,504, titled "MULTI-PROTOCOL COMMUNICATION FABRIC CONTROL," filed Apr. 25, 2019, which is hereby incorporated by reference in its entirety. This application also hereby claims the benefit of and priority to U.S. Provisional Patent Application 62/934,703, titled "COMPUTE UNITS FORMED OVER DIVERSE COMMUNICATION FABRICS," filed Nov. 13, 2019, which is hereby incorporated by reference in its entirety.

BACKGROUND

Computer systems typically include bulk storage systems, such as magnetic disk drives, optical storage devices, tape drives, or solid-state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

OVERVIEW

Deployment of arrangements of computing components coupled over a communication fabric are presented herein. In one example, a method includes detecting first computing components communicatively coupled to a first communication fabric having a first communication fabric type, and detecting second computing components communicatively coupled to a second communication fabric having a second communication fabric type. The method also includes receiving user commands to form compute units among a pool of computing components comprising the first computing components and the second computing components. Based at least on the user commands, the method includes forming the compute units for use by one or more users.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Discussed herein are various enhanced systems, processes, and platforms for providing hardware configurations among individual physical computing components coupled over one or more shared communication fabrics. Various communication fabric types might be employed herein. For example, a Peripheral Component Interconnect Express (PCIe) fabric can be employed, which might comprise various versions, such as 3.0, 4.0, or 5.0, among others. Instead of a PCIe fabric, other point-to-point communication fabrics or communication buses with associated physical layers, electrical signaling, protocols, and layered communication stacks can be employed, and these might include Gen-Z, Ethernet, InfiniBand, NVMe, Internet Protocol (IP), Serial Attached SCSI (SAS), FibreChannel, Thunderbolt, Serial Attached ATA Express (SATA Express), NVLink, Cache Coherent Interconnect for Accelerators (CCIX), Compute Express Link (CXL), Open Coherent Accelerator Processor Interface (OpenCAPI), wireless Ethernet or Wi-Fi (802.11x), or cellular wireless technologies, among others. Ethernet can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless Ethernet formats and speeds. Cellular wireless technologies might include various wireless protocols and networks built around the 3rd Generation Partnership Project (3GPP) standards including 4G Long-Term Evolution (LTE), 5G NR (New Radio) and related 5G standards, among others.

Some of the aforementioned signaling or protocol types are built upon PCIe, and thus add additional features to PCIe interfaces. Parallel, serial, or combined parallel/serial types of interfaces can also apply to the examples herein. Although the examples below employ PCIe as the exemplary fabric type, it should be understood that others can instead be used. PCIe is a high-speed serial computer expansion bus standard, and typically has point-to-point connections among hosts and component devices, or among peer devices. PCIe typically has individual serial links connecting every device to a root complex, also referred to as a host. A PCIe communication fabric can be established using various switching circuitry and control architectures described herein.

Figure 1:
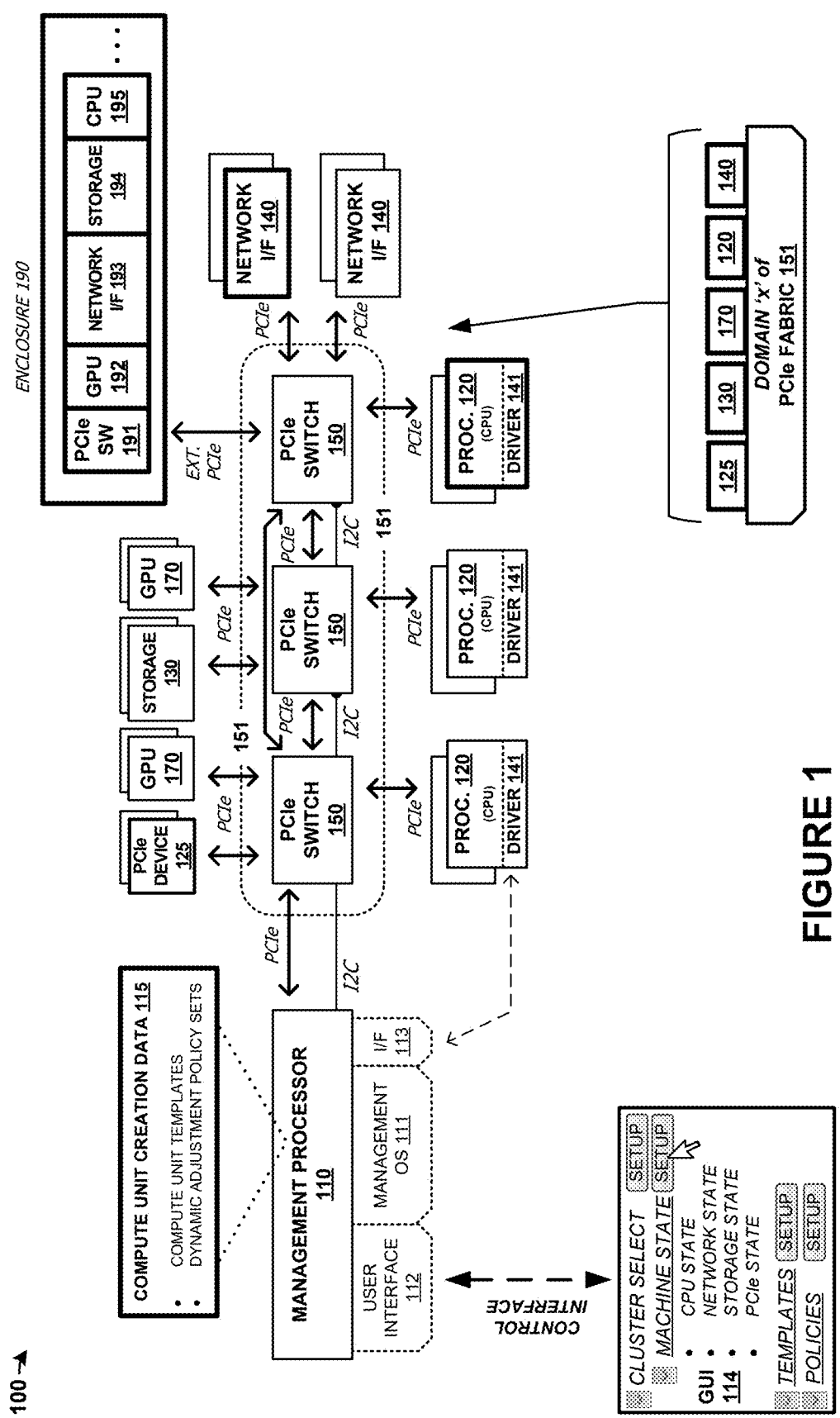
FIG. 1 is a diagram illustrating a computing platform in an implementation.

As a first example, FIG. 1 is presented. FIG. 1 is a system diagram illustrating computing platform 100. Computing platform 100 includes one or more management processors 110, and a plurality of physical computing components. The physical computing components include CPUs of processing modules 120, PCIe devices 125, storage units 130, network modules 140, PCIe switch modules 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of physical computing components and establish compute units using logical partitioning within the PCIe fabric. These compute units, referred to in FIG. 1 as machine(s) 160, can each be comprised of any number of user-defined quantities of CPUs of processing modules 120, PCIe devices 125, storage units 130, network interfaces 140 modules, and GPUs 170, including zero of any module.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the components of FIG. 1 can be included in any physical mounting environment, and need not include any associated enclosures or rackmount elements.

In addition to the components described above, an external enclosure can be employed that comprises a plurality of graphics modules, network cards, or storage modules, and processing modules, among other elements. In FIG. 1, enclosure 190 (e.g. a just a box of disks (JBOD) enclosure) is shown that includes a PCIe switch circuit 191 that couples any number of included devices, such as GPU modules 192, network interfaces unit modules 193, storage unit modules 194 and processing modules (CPUs) 195, over one or more PCIe links to another enclosure comprising the computing, storage, and network elements discussed above. The enclosure might comprise an enclosure different from a JBOD enclosure, such as a suitable modular assembly where individual modules can be inserted and removed into associated slots or bays. In JBOD examples, disk drives or storage devices are typically inserted to create a storage system. However, in the examples herein, graphics modules are inserted instead of, or in combination with, storage drives or storage modules, which advantageously provides for coupling of a large number of GPUs to handle data/graphics processing within a similar physical enclosure space. In one example, the JBOD enclosure might include 24 slots for storage/drive modules that are instead populated with one or more GPUs carried on graphics modules, one or more storage drives or storage modules, one or more network interfaces, or other elements/modules. The external PCIe link that couples enclosures can comprise any of the external PCIe link physical and logical examples discussed herein.

Once the components of platform 100 have been inserted into the enclosure or enclosures, the components can be coupled over the PCIe fabric and logically isolated into any number of separate and arbitrarily defined arrangements called "machines" or compute units. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute units can be associated with external users or client machines that can utilize the computing, storage, network, or graphics processing resources of the compute units. Moreover, any number of compute units can be grouped into a "cluster" of compute units for greater parallelism and capacity. Although not shown in FIG. 1 for clarity, various power supply modules and associated power and control distribution links can also be included.

In some examples, management processors 110 may provide for creation of compute units via one or more user interfaces. For example, management processors 110 may provide a user interface which may present machine templates for compute units that may specify hardware components to be allocated, as well as software and configuration information, for compute units created using the template. In some examples, a compute unit creation user interface may provide machine templates for compute units based on use cases or categories of usage for compute units. For example, the user interface may provide suggested machine templates or compute unit configurations for game server units, artificial intelligence learning compute units, data analysis units, and storage server units. For example, a game server unit template may specify additional processing resources when compared to a storage server unit template. Additional examples are discussed below. Further, the user interface may provide for customization of the templates or compute unit configurations and options for users to create compute unit templates from component types selected arbitrarily from lists or categories of components.

In some examples, management processors 110 may provide for policy based dynamic adjustments to compute units during operation. In some examples, the compute unit creation user interface can allow the user to define policies for adjustments of the hardware and software allocated to the compute unit as well as adjustments to the configuration information thereof during operation. In an example, during operation, the management processors 110 may analyze telemetry data of the compute unit to determine the utilization of the current resources. Based on the current utilization, a dynamic adjustment policy may specify that processing resources, storage resources, networking resources, and so on be allocated to the compute unit or removed from the compute unit. For example, the telemetry data may show that the current usage level of the allocated storage resources of a storage compute unit is approaching one hundred percent and allocate an additional storage device to the compute unit.

In some examples, management processors 110 may provide for control and management of multiple protocol communication fabrics. For example, management processors 110 and the PCIe switch devices of the PCIe fabric 151 may provide for communicative coupling of physical components using multiple different implementations or versions of PCIe and similar protocols. For example, different PCIe versions (e.g. 3.0, 4.0, 5.0, and later) might be employed for different physical components in the same PCIe fabric. Further, next-generation interfaces can be employed, such as Gen-Z, CCIX, CXL, OpenCAPI, Wi-Fi interfaces, or cellular wireless interfaces. Also, although PCIe is used in FIG. 1, it should be understood that PCIe may be absent and different communication links or busses can instead be employed, such as NVMe, Ethernet, SAS, FibreChannel, Thunderbolt, SATA Express, among other interconnect, network, and link interfaces.

Management processors 110 may group communication switches and devices operating using each protocol or protocol version as separate fabrics. In such a case, PCIe fabric 151 shown in FIG. 1 may include multiple groupings of PCIe switches 150 which each correspond to a separate fabric managed by management processors 110. In some examples, the devices of separate fabrics may not be communicatively coupled except for respective links to management processor 110. Management processors 110 may treat devices unassigned to a compute unit that are within each of the separate fabrics as parts of separate pools of free devices. When creating compute units, management processors 110 may determine which of the separate fabrics include unassigned devices that can form the specified compute unit. In some examples, the request to create a compute unit may specify one or more implementations or versions of PCIe or other designated protocols that the compute unit should utilize.

In some embodiments, management processors 110 and PCIe fabric 151 may include functionality to allow the devices and switches operating using different implementations or versions of PCIe or other communication protocols to communicate with one another. In such a case, management processors 110 may group switches and devices operating using each implementation or version of PCIe and similar protocols as separate sub-fabrics coupled by devices that provide the cross protocol communication support that allows for cross protocol communication (e.g. conversion circuitry or software in the PCIe switches or in standalone conversion units). Management processors 110 may treat devices unassigned to a compute unit as a part of a combined pool of free devices with each device having a corresponding communication protocol. When creating compute units, management processors 110 may determine which combination of unassigned devices using which communication protocols to include to form the specified compute unit.

Other performance parameters may be considered when selecting devices, such as an expected performance of a particular protocol or fabric type, as well as a quantity of protocol conversions or quantity of links between devices.

In some implementations, enclosures, such as enclosure 190, may be coupled to PCIe fabric 151. PCIe fabric 151 may utilize a primary communication protocol (e.g. PCIe version 3.0) and the enclosures may be coupled to PCIe fabric 151 using the primary communication protocol. Within the enclosures, PCIe switch 191 and physical components 192-195 may be communicatively coupled using a different communication protocol (e.g. Gen-Z or CXL) from the communication protocol. In addition, or alternatively, some of ports of PCIe switches 150 of PCIe fabric 151 may utilize different communication protocols. PCIe switch 191 of enclosure 190 or PCIe switches 150 may provide an interface between the multiple different implementations or versions of PCIe and similar protocols. In examples in which the communication switches and devices of different communication protocols are in separate fabrics and do not interconnect, management processors 110 may communicate directly with communication switches of enclosure 190 rather than via an intermediate switch that uses a different communication protocol from enclosure 190.

In some examples, management processors 110 may control the PCIe fabric 151 to form compute units using particular implementations or versions of PCIe and similar protocols. In some such examples, when creating a compute unit, management processors 110 may prevent or avoid allocating physical components that utilize the primary communication protocol with physical components from enclosures such as 190 utilizing different communication protocols (e.g. by separating the unassigned physical components into separate pools of free devices based on communication protocol or protocol version). In addition, or alternatively, some examples may include forming compute units that utilize multiple protocols and which may include physical components selected from among components 120, 125, 130, 140, and 170 as well as components in enclosures such as components 192-195.

Examples are not limited to any of the above example functions and some examples may include combinations of such functionality. For example, in some implementations, the physical components of a disaggregated computing architecture may utilize multiple communication protocols and management processors may provide templates for compute units as well as dynamic adjustments based on telemetry data. In a particular example, the physical components of the disaggregated computing architecture may include a mix of physical components that utilize either PCIe version 3.0 or another communication protocol. In the compute unit creation user interface, the user may choose to form a compute unit using a template for a game server including physical components utilizing PCIe version 3.0 and select policies for dynamic adjustment to allocate additional processing components to the compute unit if the utilization exceeds a first threshold and to migrate the compute unit to physical components utilizing the other communication protocol if the utilization exceeds a second threshold. Similarly, the opposite adjustments may be performed if utilization falls below the respective thresholds.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, field-programmable gate array (FPGA), application specific integrated circuit (ASIC), application specific processor, or other microprocessor or processing elements.

In FIG. 1, processor 110 provides interface 113. Interface 113 comprises a communication link between processor 110 and any component coupled to PCIe fabric 151, which may comprise a PCIe link. In some examples, this interface may employ Ethernet traffic transported over a PCIe link. Additionally, each processing module 120 in FIG. 1 is configured with driver 141 which may provide for Ethernet communication over PCIe links. Thus, any of processing module 120 and management processor 110 can communicate over Ethernet that is transported over the PCIe fabric. However, implementations are not limited to Ethernet over PCIe and other communication interfaces may be used, including standard PCIe traffic over PCIe interfaces.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, ASIC, FPGA, or other microprocessor or processing elements. Each processing module 120 can also communicate with other compute units, such as those in a same storage assembly/enclosure or another storage assembly/enclosure over one or more PCIe interfaces and PCIe fabric 151.

PCIe devices 125 comprise one or more instances of specialized circuitry, ASIC circuitry, or FPGA circuitry, among other circuitry. PCIe devices 125 each include a PCIe interface comprising one or more PCIe lanes. These PCIe interfaces can be employed to communicate over PCIe fabric 151. PCIe devices 125 can include processing components, memory components, storage components, interfacing components, among other components. PCIe devices 125 might comprise PCIe endpoint devices or PCIe host devices which may or may not have a root complex.

When PCIe devices 125 comprise FPGA devices, example implementations can include PCIe interfaces or other interfaces that couple to the communication fabrics discussed herein. FPGA devices, when employed in PCIe devices 125, can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device.

The management processor 110 may include a compute unit creation data storage 115, among other configuration data. In some examples, the compute unit creation data storage 115 may include compute unit templates and dynamic adjustment policy sets, among other creation data. As discussed above, the compute unit templates and dynamic adjustment policy sets may be provided via a user interface for selection to a user during compute unit creation. In such examples, the user may select the presented compute unit templates and dynamic adjustment policy sets as is, or the user may select and customize presented compute unit templates and dynamic adjustment policy sets.

In some examples, PCIe devices 125 include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. When PCIe devices 125 include FPGA devices, such as FPGA chips, circuitry, and logic, PCIe devices 125 might also include static random-access memory (SRAM) devices, programmable read-only memory (PROM) devices used to perform boot programming, power-on configuration, or other functions to establish an initial configuration for the FPGA device. In some examples, the SRAM or PROM devices can be incorporated into FPGA circuitry.

A plurality of storage units 130 are included in platform 100. Each storage unit 130 includes one or more storage drives, such as solid-state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid-state memory devices with a PCIe interface. In yet other examples, each storage unit 130 comprises one or more separate solid-state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include NVIDIA® or AMD® graphics cards that include graphics processing elements along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processing modules 120, PCIe devices 125, and storage units 130 over associated PCIe links and PCIe fabric 151. In some examples, network interfaces are provided for intra-system network communication among for communicating over Ethernet networks for exchanging communications between any of processing modules 120 and management processors 110.

Each PCIe switch 150 communicates over associated PCIe links. In the example in FIG. 1, PCIe switches 150 can be used for carrying user data between PCIe devices 125, network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

As used herein, unless specified otherwise, domain and partition are intended to be interchangeable and may include similar schemes referred to by one of skill in the art as either domain and partition in PCIe and similar network technology. Further, as used herein, unless specified otherwise, segregating and partitioning are intended to be interchangeable and may include similar schemes referred to by one of skill in the art as either segregating and partitioning in PCIe and similar network technology.

PCIe can support multiple bus widths, such as ×1, ×2, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later (e.g. 4.0, 5.0, or later) might be employed. Moreover, next-generation interfaces can be employed, such as Gen-Z, Cache Coherent CCIX, CXL, or OpenCAPI. Also, although PCIe is used in FIG. 1, it should be understood that different communication links or busses can instead be employed, such as NVMe, Ethernet, SAS, FibreChannel, Thunderbolt, SATA Express, among other interconnect, network, and link interfaces. NVMe is an interface standard for mass storage devices, such as hard disk drives and solid-state memory devices. NVMe can supplant SATA interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130, GPU 170, PCIe devices 125, or other physical components of platform 100, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or PCIe devices 125, or hand off control of any GPU or FPGA to another processing module 120.

To provide visibility of each processing module 120 to any PCIe device 125, storage unit 130, or GPU 170, various techniques can be employed. In a first example, management processor 110 establishes a cluster that includes one or more compute units 160. These compute units comprise one or more processing modules 120, zero or more PCIe devices 125, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning four storage units might be assigned to a group of two compute units 160 in a cluster. The compute units 160 assigned to a cluster then handle transactions for that subset of storage units, such as read and write transactions.

Each compute unit 160, specifically each processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In FPGA-based processing examples, NT partitioning or domain-based partitioning in the switched PCIe fabric can be provided by one or more of the PCIe switches with NT ports or domain-based features. This partitioning can ensure that PCIe devices comprising FPGA devices can be interworked with a desired compute unit and that more than one FPGA can be associated with a particular compute unit. Moreover, dynamic FPGA-compute unit relationships can be adjusted on-the-fly using partitioning across the PCIe fabric. Shared network resources can also be applied across compute units for FPGA processing elements. For example, when a first compute processor determines that the first compute processor does not physically manage the FPGA associated with a received FPGA operation, then the first compute processor transfers the FPGA operation over the PCIe fabric to another compute processor of the cluster that does manage the FPGA. In further examples, memory mapped DMA conduits can be formed between individual CPU/FPGA pairs. This memory mapping can occur over the PCIe fabric address space, among other configurations. To provide these DMA conduits over a shared PCIe fabric comprising many CPUs and FPGAs, the logical partitioning described herein can be employed. Specifically, NT ports or domain-based partitioning on PCIe switches can isolate individual DMA conduits among the associated CPUs/FPGAs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of 264 bytes, leading to at least 16 exbibytes of byte-addressable memory. The 64-bit PCIe address space can be shared by all compute units or segregated among various compute units forming clusters for appropriate memory mapping to resource units. Individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 114 to one or more users. User interface 112 and GUI 114 can be employed by end users or administrators to establish clusters, assign assets (compute units/machines) to each cluster. In FIG. 1, GUI 114 allows end users to create and administer clusters as well as assign one or more machine/compute units to the clusters. In some examples, GUI 114 or other portions of user interface 112 provides an interface to allow an end user to determine one or more compute unit templates and dynamic adjustment policy sets to use or customize for use in creation of compute units. GUI 114 can be employed to manage, select, and alter machine templates. GUI 114 can be employed to manage, select, and alter policies for compute units. GUI 114 also can provide telemetry information for the operation of system 100 to end users, such as in one or more status interfaces or status views. The state of various components or elements of system 100 can be monitored through GUI 114, such as processor/CPU state, network state, storage unit state, PCIe element state, among others. Various performance metrics, error statuses can be monitored using GUI 114 or user interface 112. User interface 112 can provide other user interfaces than GUI 114, such as command line interfaces (CLIs), application programming interfaces (APIs), or other interfaces. In some examples, GUI 114 is provided over a websockets-based interface.

One or more management processors can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with network interface 113 and communicate over a PCIe fabric using existing network-facing communication methods, such as Ethernet communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, IOS, etc . . . ) or user application software and drivers. Management driver 141 provides functionality to allow each processing module 120 to participate in the associated compute unit and/or cluster, as well as provide telemetry data to an associated management processor. In examples in which compute units include physical components that utilize multiple or different communications protocols, management driver 141 may provide functionality to enable inter-protocol communication to occur within the compute unit. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

Figure 2:
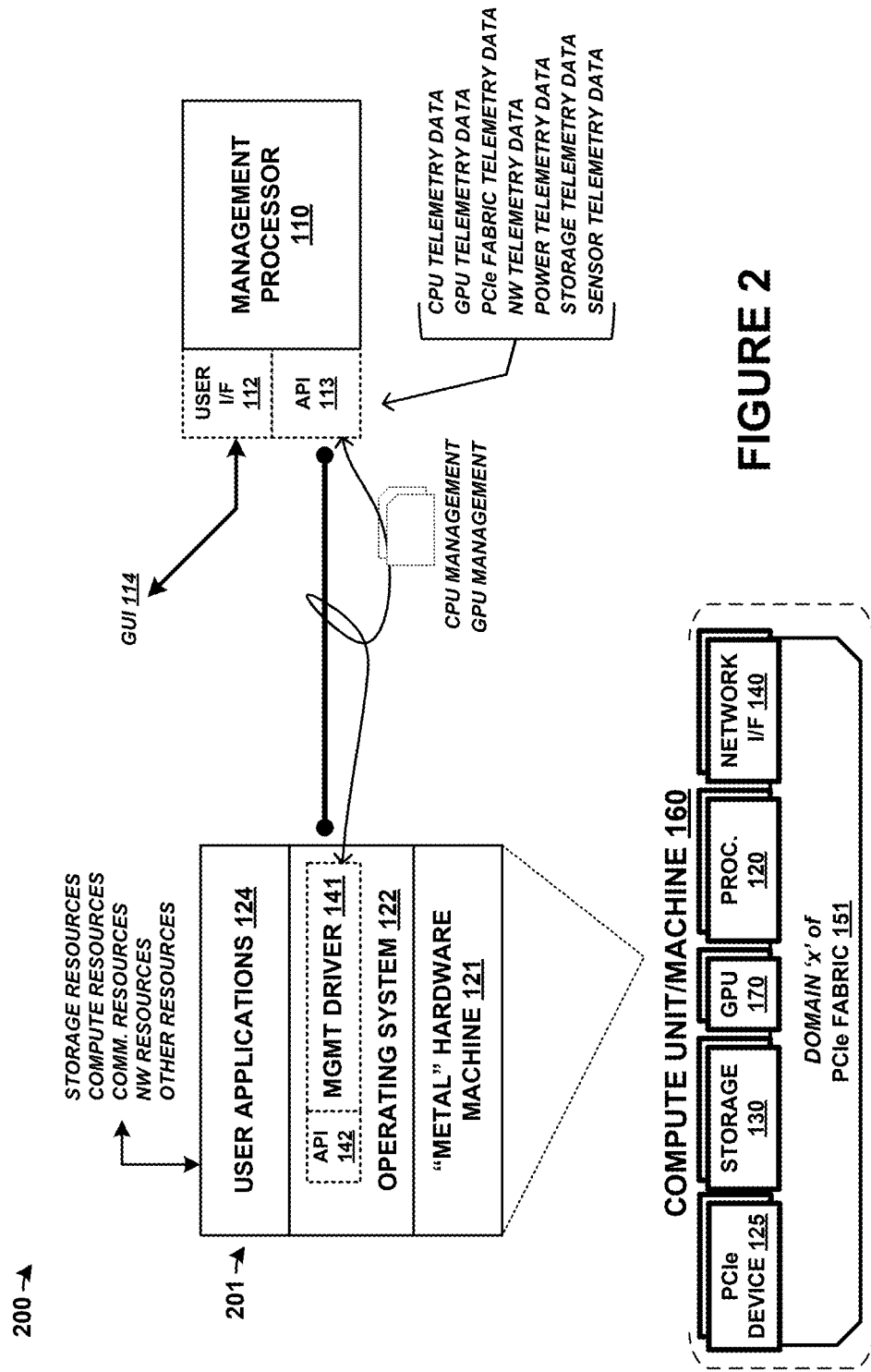
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110. In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 142. Finally, a third layer 124 provides user-level applications. View 201 shows that user applications can access storage, processing (CPU, GPU, or FPGA), and communication resources of the cluster, such as when the user application comprises a clustered storage system or a clustered processing system.

As discussed above, management driver 141 provides an emulated network device for communicating over a PCIe fabric with management processor 110 (or other processor elements). This may be performed as Ethernet traffic transported over PCIe. In such a case, a network stack is not employed in driver 141 to transport the traffic over PCIe. Instead, driver 141 may appear as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

In addition, management driver 141 may operate as an interface to device drivers of PCIe devices of the compute unit to facilitate an inter-protocol or peer-to-peer communication between device drivers of the PCIe devices of the compute unit, for example, when the PCIe devices utilize different communication protocols. In addition, management drivers 141 may operate to facilitate continued operation during dynamic adjustments to the compute unit based on dynamics adjustment policies. Further, management drivers 141 may operate to facilitate migration to alternative hardware in computing platforms based on a policy (e.g. migration from PCIe version 3.0 hardware to Gen-Z hardware based on utilization or responsiveness policies).

Control elements within corresponding PCIe switch circuitry may be configured to monitor for PCIe communications between compute units utilizing different versions or communication protocols. As discussed above, different versions or communication protocols may be utilized within the computing platform and, in some implementations, within compute units. In some examples, one or more PCIe switches or other devices within the PCIe fabric may operate to act as interfaces between PCIe devices utilizing the different versions or communication protocols. Data transfers detected may be "trapped" and translated or converted to the version or communication protocol utilized by the destination PCIe device by the PCIe switch circuitry and then routed to the destination PCIe device.

Figure 3:
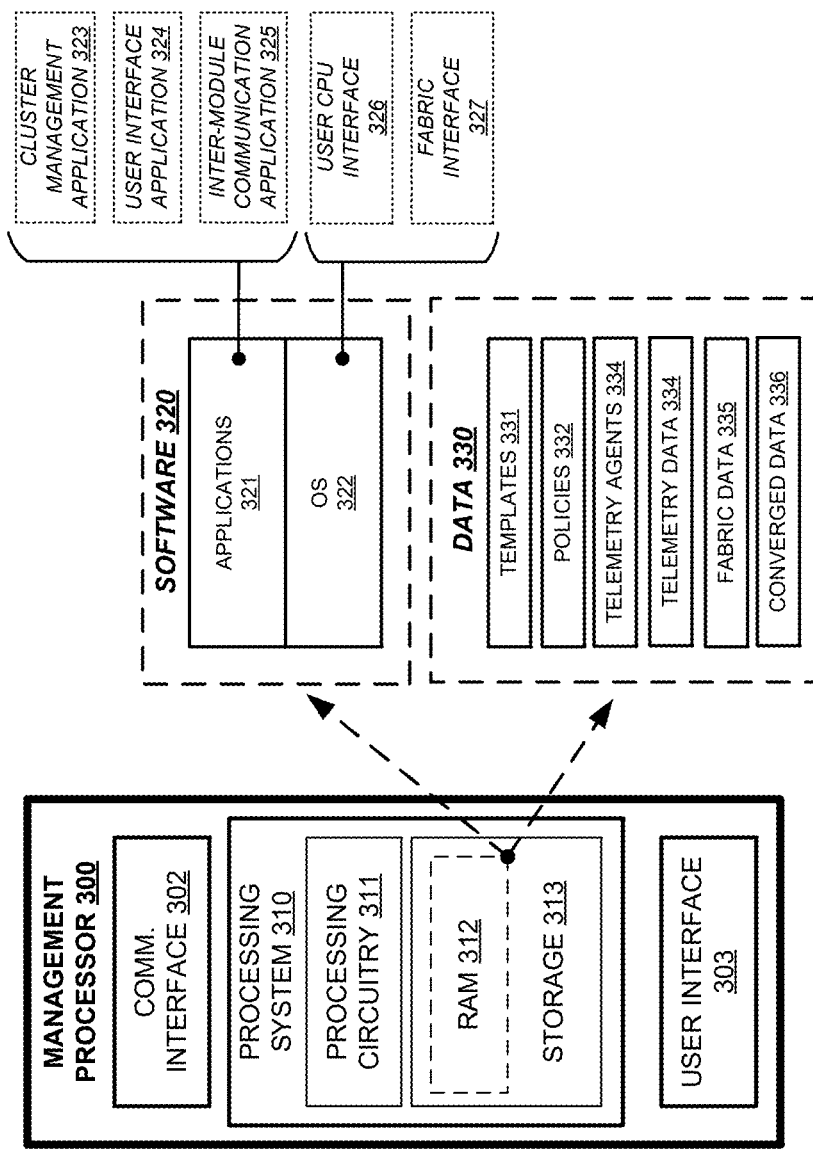
FIG. 3 is a block diagram illustrating a management processor in an implementation.

FIG. 3 is a block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage system 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

Storage system 313 and RAM 312 together can comprise a non-transitory data storage system, although variations are possible. Storage system 313 and RAM 312 can each comprise any storage media readable by processing circuitry 311 and capable of storing software and OS images. RAM 312 can include volatile and nonvolatile, removable and non-removable media implemented in any method or technology for storage of information, such as computer readable instructions, data structures, program modules, or other data. Storage system 313 can include non-volatile storage media, such as solid-state storage media, flash memory, phase change memory, or magnetic memory, including combinations thereof. Storage system 313 and RAM 312 can each be implemented as a single storage device but can also be implemented across multiple storage devices or sub-systems. Storage system 313 and RAM 312 can each comprise additional elements, such as controllers, capable of communicating with processing circuitry 311.

Software or data stored on or in storage system 313 or RAM 312 can comprise computer program instructions, firmware, or some other form of machine-readable processing instructions having processes that when executed a processing system direct processor 300 to operate as described herein. For example, software 320 can drive processor 300 to receive user commands to establish clusters comprising compute units among a plurality of physical computing components that include processing modules, storage modules, and network modules. Software 320 can drive processor 300 to receive and monitor telemetry data, statistical information, operational data, and other data to provide telemetry to users and alter operation of clusters according to the telemetry data, policies, or other data and criteria. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Intermodule communication application 325 provides communication among other processor 300 elements, such as over I2C, Ethernet, emulated network devices, or PCIe interfaces. User CPU interface 326 provides communication, APIs, and emulated network devices for communicating with processors of compute units, and specialized driver elements thereof. Fabric interface 327 establishes various logical partitioning or domains among communication fabric circuit elements, such as PCIe switch elements of a PCIe fabric. Fabric interface 327 also controls operation of fabric switch elements, and receives telemetry from fabric switch elements. Fabric interface 327 also establishes address traps or address redirection functions within a communication fabric. Fabric interface 327 can interface with one or more fabric switch circuitry elements to establish address ranges which are monitored and redirected, thus forming address traps in the communication fabric.

In an example including multiple communication protocols within the computing platform, a compute unit created using a data analytics template may include a CPU (e.g. processing module 120) attached to the PCIe fabric (e.g. PCIe fabric 151) via a corresponding PCIe version and one or more GPU modules and storage modules within an enclosure utilizing a different PCI version, among other protocols, interfaces, and revisions thereof. One or more of the PCIe switches may provide for peer-to-peer functionality between the GPU modules and storage modules of the enclosure over differing versions of PCIe or differing protocols (e.g. PCIe to Gen-Z), as well as providing an interface between the CPU and the GPU modules and storage modules. The CPU may coordinate data retrieval and analysis between the GPU modules and storage modules using the a first PCIe version communication protocol while a second PCIe version or communication protocol may be used to perform the data retrieval and analysis. Further, the management processor may monitor telemetry data from the compute unit and, in accordance with dynamic adjustment policies, allocate additional or deallocate excess GPU modules and storage modules of the enclosure to the compute unit. While in this example, the PCIe switches provide cross protocol support, in other examples, additional devices may be provided to enable cross-protocol communication.

In addition to software 320, other data 330 can be stored by storage system 313 and RAM 312. Data 330 can comprise templates 331, machine policies 332, telemetry agents 333, telemetry data 334, fabric data 335, and converged data 336. Templates 331, machine policies 332, telemetry agents 333, and telemetry data 334 can be applied against triggers in policies 332. Templates 331 includes specifications or descriptions of various hardware templates or machine templates that have been previously defined. Templates 331 can also include lists or data structures of components and component properties which can be employed in template creation or template adjustment. Machine policies 332 includes specifications or descriptions of various machine policies that have been previously defined. These machine policies specifications can include lists of criteria, triggers, thresholds, limits, or other information, as well as indications of the components or fabrics which are affected by policies. Machine policies 332 can also include lists or data structures of policy factors, criteria, triggers, thresholds, limits, or other information which can be employed in policy creation or policy adjustment. Telemetry agents 333 can include software elements which can be deployed to components in compute units for monitoring the operations of compute units. Telemetry agents 333 can include hardware/software parameters, telemetry device addressing, or other information used for interfacing with monitoring elements, such as IPMI-compliant hardware/software of compute units and communication fabrics. Telemetry data 334 comprises a data store of received data from telemetry elements of various compute units, where this received data can include telemetry data or monitored data. Telemetry data 334 can organize the data into compute unit arrangements, communication fabric arrangements or other structures. Telemetry data 334 might be cached as data 330 and subsequently transferred to other elements of a computing system or for use in presentation via user interfaces. Fabric data 335 includes information and properties of the various communication fabrics that comprise a pool of resources or pool of components, such as fabric type, protocol version, technology descriptors, header requirements, addressing information, and other data. Fabric data 335 might include relations between components and the specific fabrics through which the components connect. Converged data 336 includes data on converged servers and systems, such as which component properties, fabric properties, which components are included in the same server or system, which components can be separately added into compute units, and which components must be added as a group or set with other components, among other data.

Software 320 can reside in RAM 312 during execution and operation of processor 300, and can reside in non-volatile portions of storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid-state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

The systems and operations discussed herein provide for dynamic assignment of computing resources, graphics processing resources, network resources, or storage resources to a computing cluster. The compute units are disaggregated from any particular cluster or compute unit until allocated by users of the system. Management processors can control the operations of the cluster and provide user interfaces to the cluster management service provided by software executed by the management processors. A cluster includes at least one "machine" or computing unit, while a compute unit include at least a processor element. Computing units can also include network interface elements, graphics processing elements, and storage elements, but these elements are not required for a computing unit.

Processing resources and other elements (graphics processing, network, storage, FPGA, or other) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, ISCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources (e.g. GPUs) or FPGA resources can be shared among more than one compute unit of a cluster using NT partitioning or domain-based partitioning over the PCIe fabric and PCIe switches.

Figure 4:
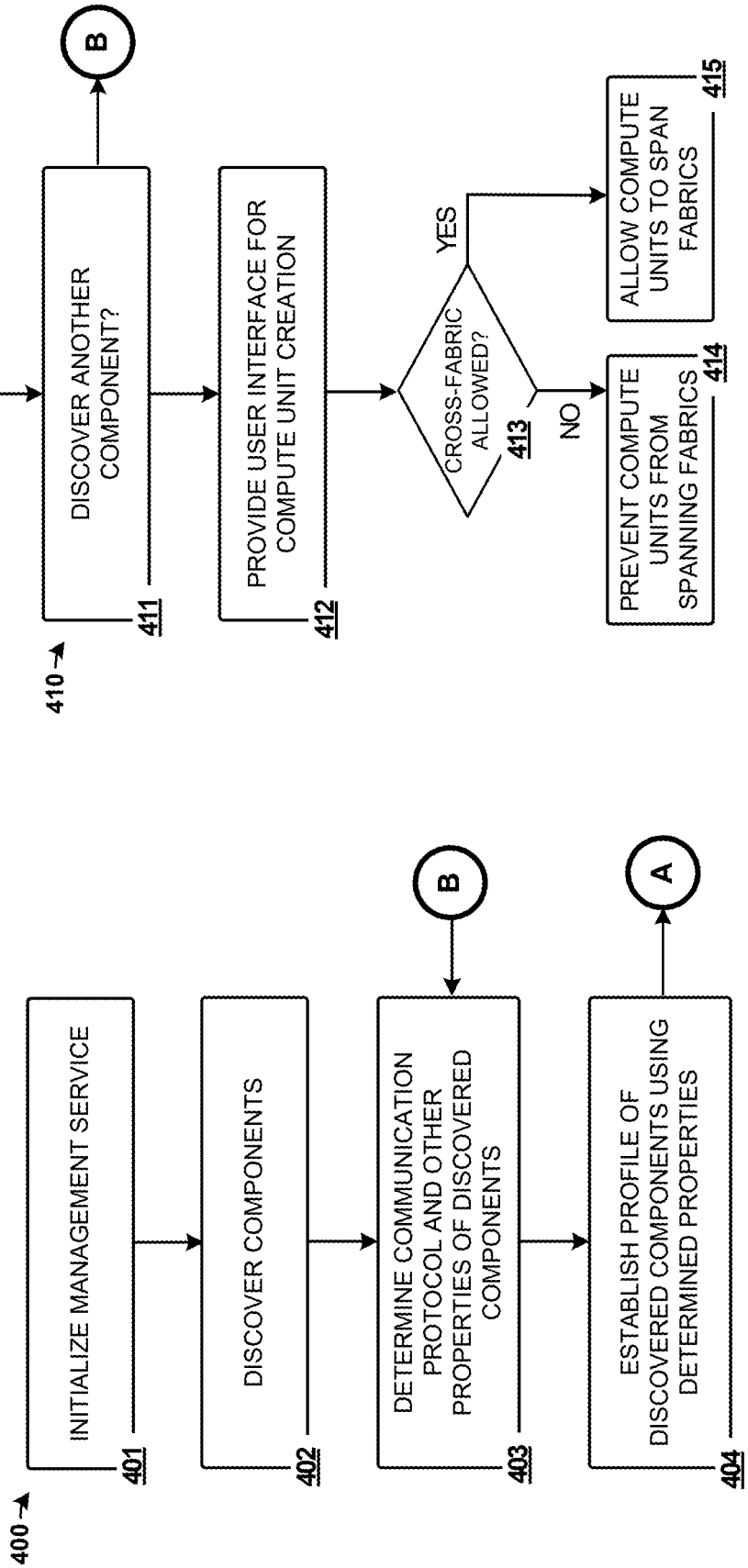
FIG. 4 includes a flow diagram that illustrates an operational example of compute units in an implementation.

FIG. 4 includes a flow diagram that illustrates an operational example of functionality to initialize a disaggregated computing system of the systems discussed herein, such as for computing platform 100 of FIG. 1, system 200 of FIG. 2, or management processor 300 of FIG. 3. In FIG. 4, operations will be discussed in context of elements of FIG. 1, although the operations can also apply to those in FIGS. 2 and 3.

Management processor 110 initializes (401) a management service configured to perform establishment of the disaggregated computing system that provides for creation and alteration of machines and clusters using the PCIe fabrics. The management service may then perform a discovery process to discover (402) components via an associated communication fabric. The management service may then determine (403) a communication protocol and other properties of the discovered components and associated communication fabric. For example, when a first component is discovered on a first fabric type, the component may be flagged with a bit identifying what fabric type commands and drivers to use when managing the component. Using the determined information, the management service may establish (404) a free pool profile for the discovered component. Implementations may vary in the creation of the free pool profiles. For example, in implementations that do not include cross-protocol communication for having different fabric types within compute units, the free pool may be logically segregated by communication protocol or fabric type. In implementations which provide cross-protocol communication within compute units, the free pool may be logically unified with additional properties for use in selecting suitable combinations of components from among the multiple protocol free pool.

After the free pool profile has been established, the management service may attempt to discover (411) other components. If another component is discovered, the management service may return to operation 403 to determine properties of and establish a free pool profile for the new component. Otherwise, the management service may provide (412) a user interface for creation of compute units using the free pool profiles. For example, the compute units may be created and components of the various fabrics may be managed based on the discussed flags included in the free pool profiles. In a particular example, the flags may be used in commands for creating compute units such as commands to attach a device port to a host port, detach a device port from a host port, probe a device to see its health/state, and so on. Further examples of compute unit creation are discussed herein.

Management processor 110 can enable or disable cross-protocol communication within individual compute units (413). In this manner, management processor 110 might limit users, templates, or policies from establishing compute units that include components coupled to different communication fabric types or having different communication protocols or protocol versions within the same compute unit. Compute unit creation might instead be enabled to span communication fabric types, referring to cross-protocol communication. When cross-protocol or cross-fabric communication is allowed or enabled, then a protocol or fabric conversion unit might be employed between a primary communication fabric and a secondary communication fabric. This conversion unit, such as discussed below for conversion units 811 and 1211 in their respective FIGS., can convert between communications of different fabric types, fabric communication protocols, or communication protocol versions. Management processor 110 can enable a conversion unit to interwork at least one among a communication fabric type, communication protocol type, or communication protocol version among selected physical components of the compute units, such as when a first selected component of a compute unit is coupled to a first communication fabric and a second selected component of the compute unit is coupled to a second communication fabric of a different type, protocol, or protocol version. When cross-protocol or cross-fabric is forbidden or limited, then compute unit creation can only include elements that are coupled to the same type or fabric, same protocol, or same protocol version. However, even when cross-protocol or cross-fabric compute units are limited, management processor 110 can still allow for creation of a first compute unit using components of a first fabric type and creation of a second compute unit using components of a second fabric type.

In FIG. 4, if cross-fabric compute units are not allowed (414), then management processor 110 or the associated user interface can forbid creation of such compute units. Errors or flags can be presented to a user to indicate when components cannot be added into a compute unit due to spanning across different fabric types. Moreover, separate lists or collections of components might be segregated based on fabric type so as to prevent users from creating compute units that span different fabric types. If cross-fabric compute units are allowed, then the user interface can allow (415) creation of such compute units and configure any conversion units to allow for components of one fabric to be included in the same compute unit as components of another fabric. Moreover, a logical domain might be established to span more than one fabric type, or more than one domain might be formed within each fabric with a second higher-level logical domain created by management processor 110 to facilitate creation of a compute unit that appears to a user to be coherently formed from components even though the components are coupled through different fabrics.

In a further example, user can indicate via user commands to add selected components to form a first compute unit. The selected components might be determined to not span across fabrics of more than one fabric type, protocol, or protocol version. The selected components might instead be determined to span across fabrics of more than one fabric type, protocol, or protocol version. Thus, user commands might indicate to form a first compute unit from among selected components that span a first communication fabric and a different (type, protocol, or protocol version) second communication fabric. Based at least on a first configuration set by management processor 110 inhibiting spanning of compute units across different communication fabric types, the user interface can indicate to a user that the first compute unit cannot be formed among the selected components. Based at least on a second configuration set by management processor 110 allowing spanning of compute units across different communication fabric types, the user interface can indicate to the user that the first compute unit can be formed among the selected components.

Figure 5:
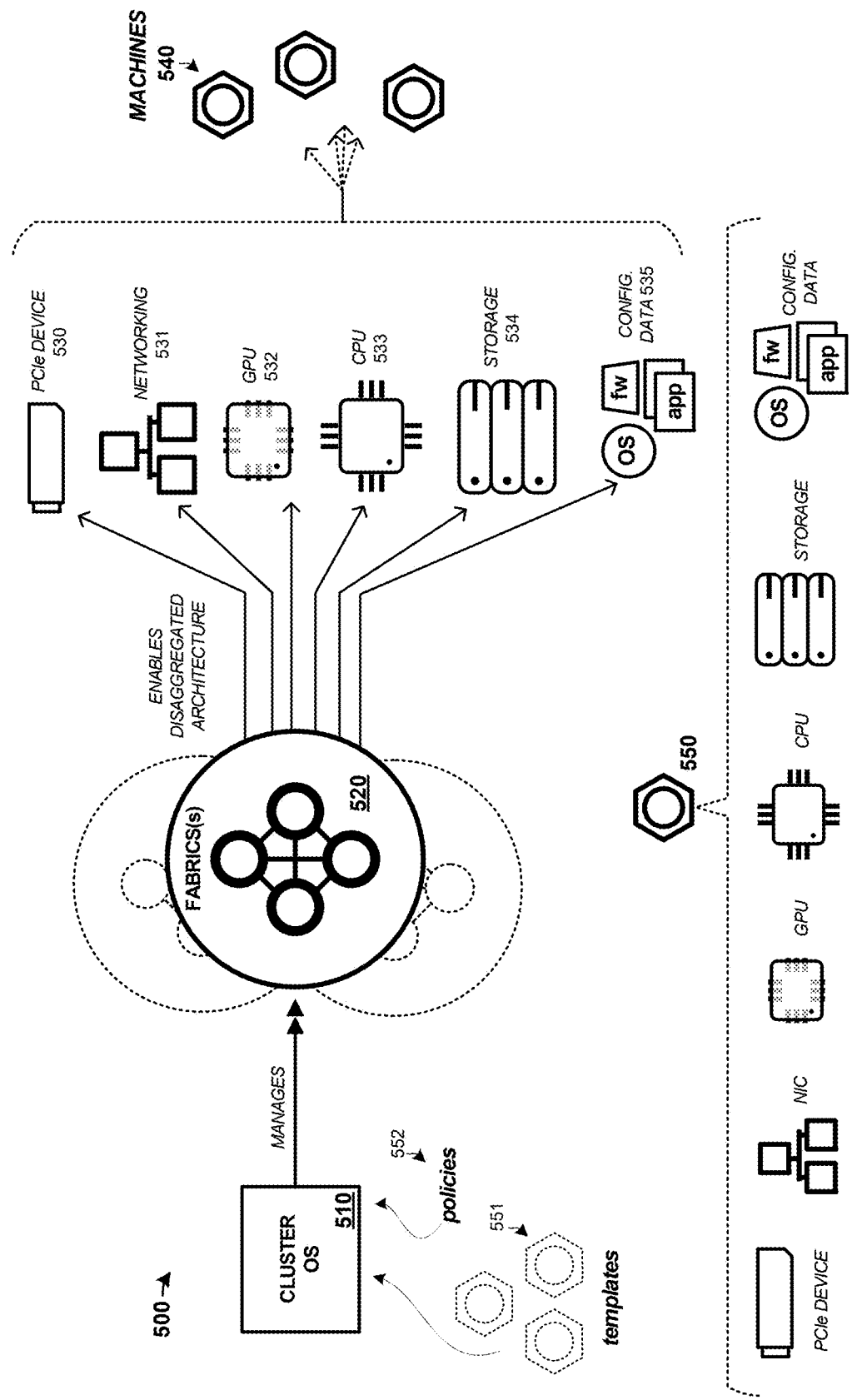
FIG. 5 illustrates example cluster management implementations.

FIG. 5 illustrates a disaggregated infrastructure 500 highlighting cluster management operating system (OS) 510 executed by a management processor and control of one or more communication fabrics 520. Although a PCIe-based fabric is discussed in FIG. 5, it should be understood that other fabric types, protocols, and versions can be employed. The management OS provides for the management, automation, and orchestration of PCIe devices that might include storage, memory, compute, GPU, FPGA, and network elements on PCIe-based fabrics. For example, PCIe device elements 530, storage elements 534, central processing elements (CPU) 533, graphics processing elements (GPU) 532, and network interface card (NIC) elements 531 are all able to be communicatively coupled over PCIe fabric 520. The PCIe fabric enables the disaggregated architecture by providing a partition-able communication medium for coupling the various elements into compute units and grouping the compute units into clusters.

To provide the disaggregated architecture, FIG. 5 illustrates a pool of free elements (530-534) that have not yet been assigned to a particular "machine" 540 or compute unit and operating systems and applications 535 present on the free pool of elements (530-534) or that may be deployed to storage devices for use in machines 540. The free elements are physically present in the associated system but remain idle or unassigned to a particular cluster/machine/compute unit. The management OS can select among the free elements and assign selected ones of the free elements to a machine. Requirements for the machine, such as what tasks the machine is being employed for, can be processed by the management OS to aid in selection of proper PCIe device elements among the free compute, GPU, FPGA, network, memory, and storage elements. As discussed above, in multiple protocol examples which do not provide for cross protocol communication, the pool of free elements may be segregated by communication protocol and may logically be considered to be utilized in separate PCIe fabrics 520.

Users can interface with graphical or command-line interfaces that allow definition or indication of the requirements or other user targets. In the illustrated example, the user interface may allow present and allow the user to select hardware or software components 550 for machines 540 (e.g. compute units) that may specify hardware components to be allocated, as well as software and configuration information, for compute units created using the template. A user might select to create compute units based one or more machine templates 551, which employs components from among those shown for components 550. The user interface may further allow the user to customize or create machine templates 551. Furthermore, users can select, customize, or create one or more operational policies 551 which can dynamically alter the composition of created compute units.

The management OS can select among the free elements in response to the user requests. In some examples, the management OS may deploy configuration data 535 to storage devices to be used in a machine 540. In some examples, the management OS may respond user instructions that specify a particular configuration data 535 to deploy to a PCIe device. In other examples, the user instructions may include one or more fields that identify characteristics for configuration data 535 to be deployed and the management OS may be configured to select configuration data 535 that matches the identified characteristics. Further, in some examples, the user instructions may specify the PCIe device to receive configuration data 535 while, in other examples, the management OS may select the PCIe device, for example, based on user specifications. In addition, where the management OS selects configuration data 535 and PCIe device, the management OS may determine whether a free pool storage device already includes configuration data 535 such that the free pool PCIe device may be allocated to machine 540 without deployment operations.

As mentioned above, the management OS may operate to select configuration data 535 and free pool elements based on characteristics specified by the user. In such examples, the management OS can learn to recognize various requests for elements and select suitable elements from the free pool. For example, the management OS can recognize particular user-provided configuration data, such as operating systems, user-provided applications, or user-provided FPGA programming files, and select certain free elements to include in one or more machines based on that recognition. In one example, the operating system to be executed by a particular machine might be specified by a user to be a Linux operating system. Particular elements can be selected from the free pool to enable the machine to run the Linux operating system. User applications, operating systems, storage requirements, interface or traffic requirements, or other considerations can be used to select elements to include in each machine. In another example, a particular FPGA programming state or programming file might be selected for deployment to an FPGA device to be included in machine 540.

Figure 6:
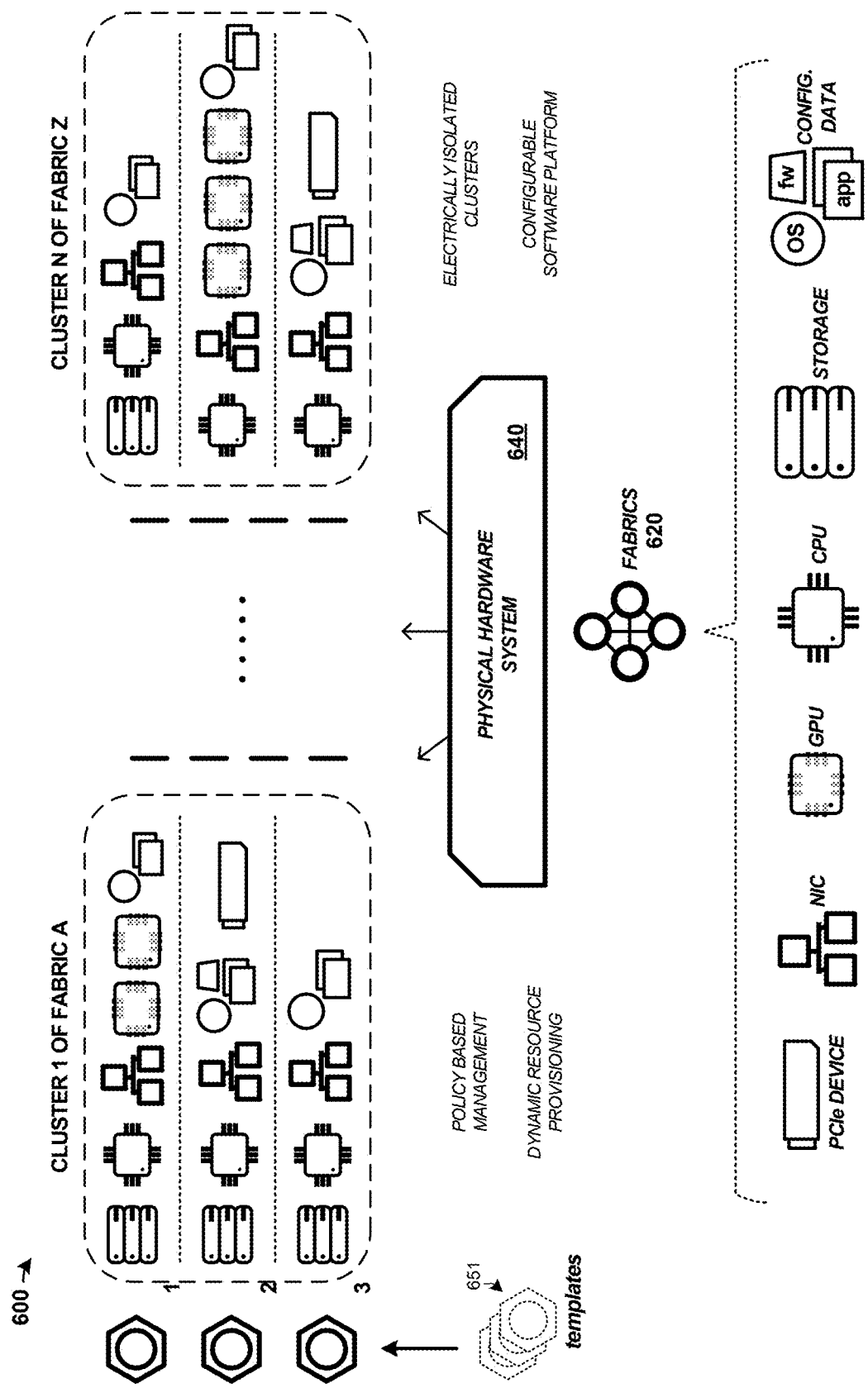
FIG. 6 illustrates example cluster management implementations.

FIG. 6 illustrates clustered operation during dynamic "bare metal" orchestration in a segregated multiple protocol example. Several machines are shown for each cluster of a plurality of PCIe fabrics 620, with associated machines comprised of physical elements/resources 640 such as CPUs, FPGAs, GPUs, NICs, storage drives, memory devices and other PCIe devices, along with software/configuration data directed or deployed thereto. The clusters are electrically isolated within each fabric 620, and a management system can dynamically pull elements/resources from a pool of free elements, such as seen in FIG. 5. Thus, one or more physical enclosures, such as a rack-mounted hardware arrangement, can have many elements (i.e. several processors, FPGAs, network interfaces, GPUs, memory devices, storage drives, or other PCIe devices) and these elements can be allocated dynamically among any number of clusters and associated compute units/machines.

FIG. 6 illustrates example clusters, 1-N, of example fabrics, A-Z, with any number of clusters and communication fabrics possible depending upon the availability of resources to be assigned to machines of the clusters. Although each cluster is shown to have three machines, it should be understood that more or less than three machines per cluster can be utilized. Moreover, each machine in each cluster indicates example elements assigned thereto. Further, although each PCIe fabric is shown to have a respective cluster, it should be understood that more or less clusters per PCIe fabric can be utilized.

These assigned elements can change dynamically according to dynamic adjustment policies, user commands, user instructions, preemptive or predictive allocation, idle/spin-down based removal, or other considerations. One or more management services or control processors can be configured to perform this establishment and alteration of machines and clusters using the PCIe fabric as a medium to couple the various elements dynamically. For example, the management services or control processors may dynamically adjust the components of the machines based on dynamic adjustment policies included in machine templates 651 or as specified by the user. For example, in the case of a data analysis compute unit, the selected machine template may include a dynamic adjustment policy indicating a usage threshold at which an additional GPU module is to be added to the compute unit. In such a case, the management services or control processors may determine that the compute unit has exceeded the usage threshold and dynamically pull a GPU module from the pool of free elements and add the GPU module to the compute unit.

Figure 7:
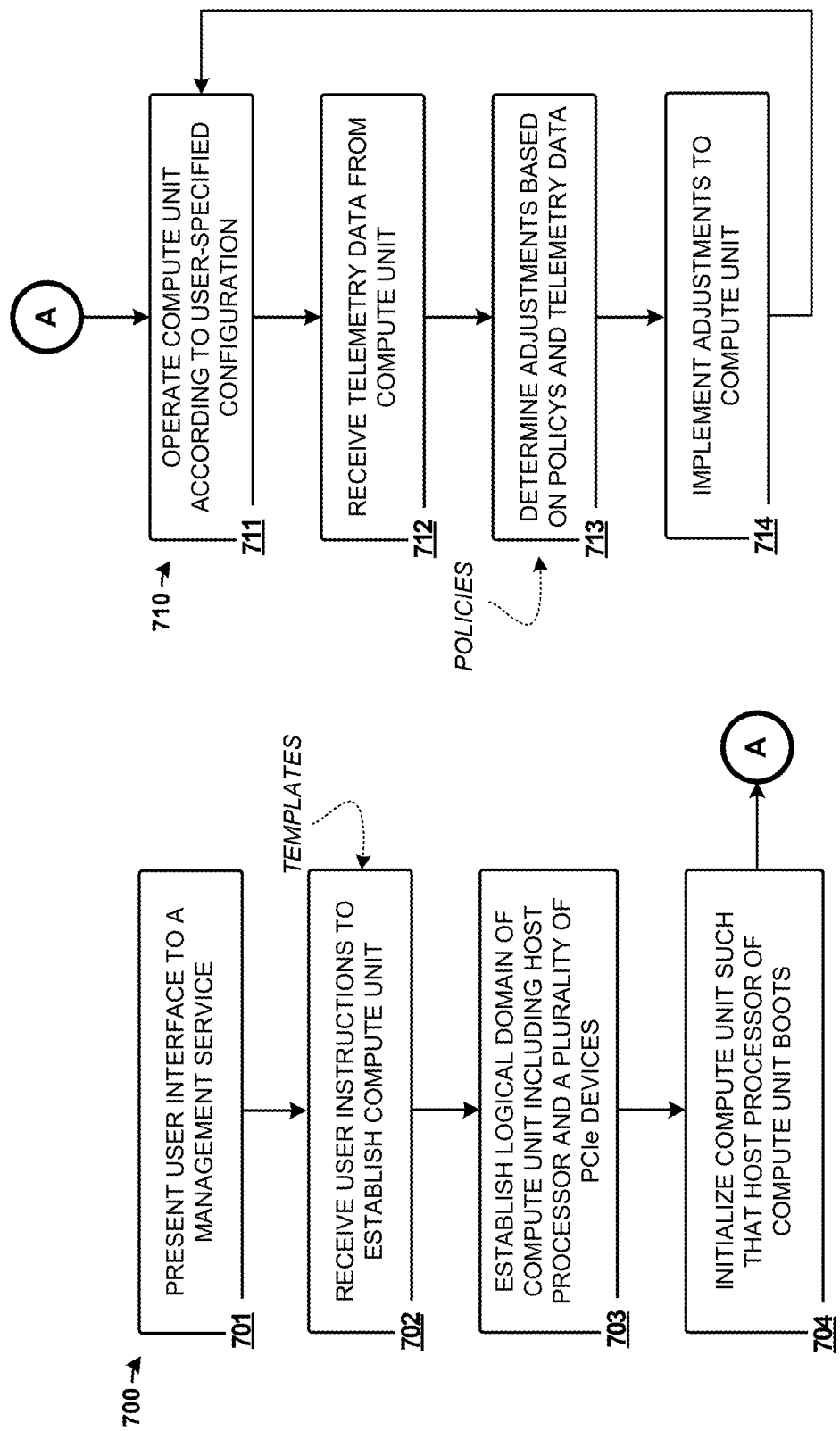
FIG. 7 includes a flow diagram that illustrates an operational example of compute units in an implementation.

FIG. 7 includes a flow diagram that illustrates operational example 700 of functionality to establish compute units and perform dynamic adjustment based on policies in compute units for any of the systems discussed herein, such as for computing platform 100 of FIG. 1, system 200 of FIG. 2, or processor 300 of FIG. 3. In FIG. 7, operations will be discussed in context of elements of FIGS. 1 and 2, although the operations can also apply to any of the examples herein.

In FIG. 7, management processor 110 presents (701) a user interface, such as compute unit creation interface 411. This user interface can comprise a GUI or other user interfaces through which users may select and configure templates and dynamic adjustment policies of compute units. Management processor 110 may receive (702) user instructions to establish a compute unit, for example, based on the entry to the compute unit creation interface. In some examples, the user instructions may be received via a graphical user interface (GUI) or command line interface (CLI) as part of user instructions to establish a cluster or may be received in instructions to establish a specific compute unit. In the event free resources or physical components to form a compute unit are not available, management processor 110 can record the inability to fulfill the template in an error log for the user. The user might get one or more notifications via the associated user interface indicating an error and what resources were not sufficient to establish the compute unit. Management processor 110 may establish a request queue which delays creation of compute units until sufficient resources are available or free. Once sufficient resources are free, then management processor 110 can proceed to establish the compute unit.

The instructions can indicate to create a compute unit using one or more specified physical components and software components. A user or operator might issue instructions to build a compute unit composed of specific components or types of components, which can be selected from lists, categories, menus, and the like presented in the user interface. Command line instructions might indicate components via a naming convention and parameter-based instruction. A user might be presented with one or more machine templates which indicate pre-selected arrangements of components and configurations to create at least one compute unit. A user might develop one or more new machine templates or adjust existing machine templates. In this manner, a user or operator has several pathways from which to initiate creation of a compute unit, namely a customized compute unit, template-based compute unit, or combination thereof.

Upon receiving the user instructions to establish the compute unit, management processor 110 may establish (703) connections via a logical domain in a communication fabric that includes host processor 120 and a plurality of devices (e.g. storage devices, GPUs, NICs, FPGAs, etc . . . ). Various examples for establishing logical domains in PCIe fabrics and other communication fabrics are discussed herein. Referring to these examples, these connections may operate to add devices into a logical domain from a free pool of devices. Establishing a logical PCIe domain may provide PCIe physical layer visibility between the PCIe devices of the domain. Management processor 110 may then initialize (704) the compute unit such that the host processor of the compute unit boots and begins to operate. A software configuration, such as operating system, user applications, system applications, virtualized components, telemetry elements, device drivers, customizations, or other software configurations can be deployed to the compute unit for usage by a processor of the compute unit. The processor might be designated as a host processor which executes an operating system and applications for the compute unit. Other processors can be included in each compute unit that perform similar tasks or instead act as backup processors or subordinate processors.

FIG. 7 also illustrates operations 710, such as for a user or management processor to monitor or modify operation of an existing compute units. An iterative process can occur where a management processor can monitor and modify the physical components of the compute units and physical components can be added, removed or migrated.

In operation 711, a compute unit is operated according to specified configurations and user instructions, such as those discussed in operations 701-704. The operation of the compute unit can include executing user operating systems, user applications, content server operations, database operations, user storage processes, graphics processing operations, machine learning operations, and artificial intelligence operations, among other user operations. During operation of the compute unit, telemetry is received (712) by a management processor from the various elements comprising the compute unit, such as PCIe switch elements, processing elements, storage elements, network interface elements, and other elements, including system and user software executed by the processing elements. The telemetry data can be analyzed by the management processor against one or more dynamic adjustment policies. These policies can indicate triggers, events, or thresholds which prompt changes to the compute unit via dynamic adjustments.

The adjustments made to the compute unit can comprise changes to the composition of devices employed in the compute unit. For example, one or more components can be added, removed, or reconfigured based on the adjustments. These changes can be made to bring the operation of the compute unit to within a desired operational range according to the dynamic adjustment policies. For example, when storage levels of a storage device reach threshold levels indicated in the dynamic adjustment policies, then additional storage devices can be brought into the compute unit. When processor utilization exceeds a target level, then the dynamic adjustment policies can indicate that additional processing capacity be brought into the compute unit. Conversely, when excess capacity is detected for a compute unit, then a portion of that capacity can be removed from the compute unit and returned to a free pool of resources for use by other compute units. The dynamic changes can be achieved by altering the logical partitioning within the communication fabric, such as altering domain connections within a PCIe fabric. A reboot or restart of the compute unit may be employed in some examples to allow additional components or devices to be recognized for use by the compute unit. However, some changes might be able to be accomplished without reboot, depending partially upon the nature of the change and the capabilities of the communication fabric, operating system, device drivers, and the like. For example, storage capacity might be added without reboot of an operating system by 'hot' addition (or removal) of storage devices for the compute unit. Once the changes to the compute units are determined, then the management processor can implement (713) the adjustments by aforementioned changes in active/inactive components, communication fabric alterations, and possible restarts/reboots.

Figure 8:
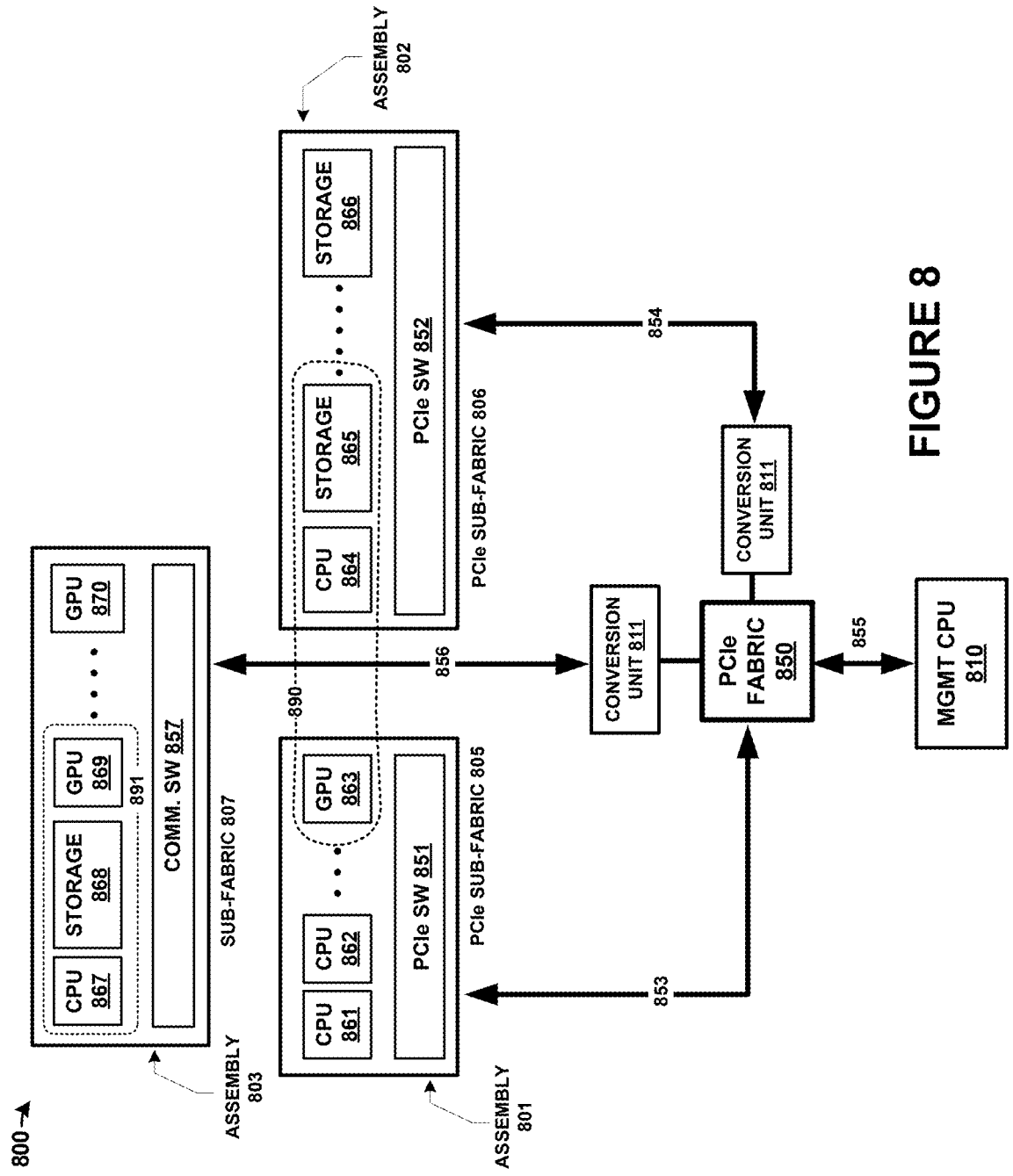
FIG. 8 is a diagram illustrating components of a computing platform in an implementation.

FIG. 8 is presented to illustrate example operations in the context of a computing platform. In FIG. 8, computing platform 800 is presented and performs operations 910 and 920 of FIG. 9. Computing platform 800 includes a management CPU 810, PCIe fabric 850, as well assemblies 801-803 that house a plurality of associated CPUs, GPUs and storage devices 861-870, as well as a PCIe switches 851-852 and communication switches 857. Assemblies 801-803 might comprise any chassis, rackmount or "just a box of disks" (JBOD) or "just a bunch of logic" (JBOL) assemblies. In the current example, the assembly 801 utilizes a first communication protocol and associated PCIe version in a first PCIe sub-fabric 805, the assembly 802 utilizes a second communication protocol and associated PCIe version in a second PCIe sub-fabric 806 and assembly 803 utilizes a third communication protocol, such as Gen-Z, CXL, or a different version of the PCIe protocol in a third sub-fabric 807. In some examples, the PCIe fabric 850 may utilize the first communication protocol and associated PCIe version. A number of PCIe links interconnect the elements of FIG. 8, namely PCIe links 853-856. In some examples, PCIe link 855 may comprise a special control/management link that enables administrative or management-level access of control to PCIe fabric 850 in addition to data/communication links.

Each protocol can be its own "sub-fabric" box coupled through the conversion element to the PCIe fabric 850. The conversion units may couple via compatible cabling/connectors to a fabric control box, such as a top of rack switch, within PCIe fabric 850 which can interface to each individual sub-fabric or box over the associated protocol/link, and then interwork/convert traffic among them. Conversion units 810-811 may operate to act as interfaces between PCIe devices utilizing the different versions or communication protocols. Data transfers detected may be "trapped" and translated or converted to the version or communication protocol utilized by the destination device by the conversion unit circuitry and then routed to the destination device. More particularly, conversion unit 810 may convert a first communication protocol to a second communication protocol, and vice versa, which may entail different physical, link, or transport layers. Similarly, conversion unit 810 may convert a first communication protocol to a third communication protocol, and vice versa, which may entail different physical, link, or transport layers.

Figure 9:
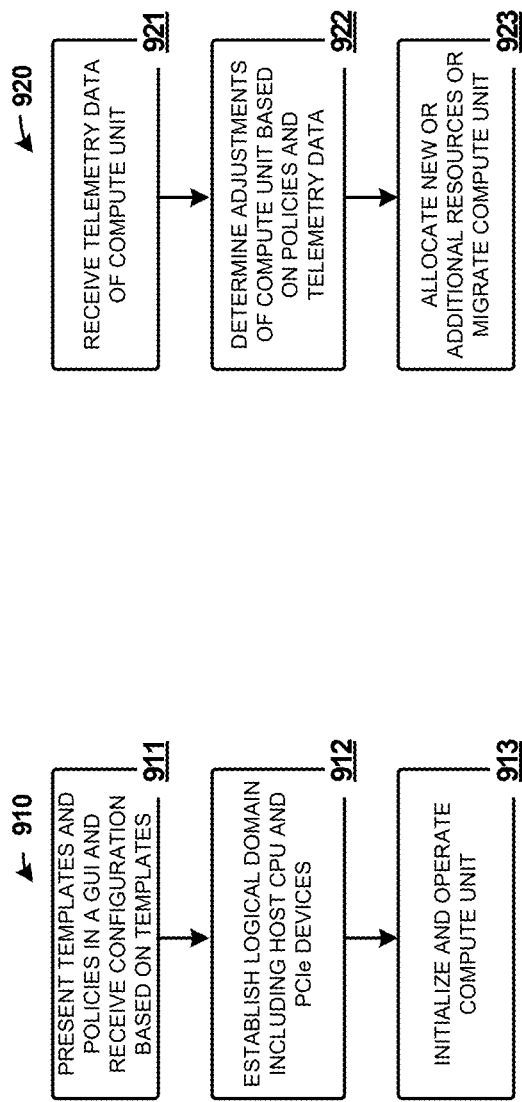
FIG. 9 is a diagram illustrating example operations of components of a computing platform in an implementation.

Turning to the operation of the computing platform 800, management CPU 810 performs the operations 910 and 920 in FIG. 9. Operations 910 establish a compute unit based at least on machine templates and machine policies. In operation 911, management CPU 810 presents a compute unit creation user interface. In one example, management CPU 810 can present a user interface indicating a plurality of machine templates each specifying at least a predefined arrangement of physical computing components for inclusion in compute units. The plurality of physical computing components can include central processing units (CPUs), graphics processing units (GPUs), data storage devices, field-programmable gate arrays (FPGAs), network interface modules (NICs), specialized devices, or other devices coupled over a shared communication fabric. The elements of FIG. 8 illustrate several such physical components which are segregated into various sub-fabrics but are all communicatively coupled by PCIe fabric 850.

The plurality of templates each describe device attributes of associated physical computing components and a set of communication connections between a host processor and other components indicated among the associated physical computing components. When a compute unit is formed, a particular CPU or processor of the compute unit can be designated as a host processor or main processor. This host processor typically will execute an operating system for the compute unit to function as a computing machine. Various physical computing components will be communicatively coupled to the host processor using logical partitioning in a communication fabric, such that the host processor can boot into an operating system and have visibility to the physical computing components as if the host processor and physical computing components were a discrete computing machine. In addition to device attributes of associated physical computing components, the plurality of templates can also each specify a software configuration to be deployed to an associated device of the compute unit, such as to a host processor, storage device, FPGA, or other device that can accept or store software configurations. The software configuration can comprise one or more operating systems, device drivers, and user applications.

Machine policies can also be employed for dynamic adjustment of compute units, with or without the use of machine templates. When policies are employed, management CPU 810 can present a user interface indicating a plurality of policies specifying operational triggers and responsive actions for altering composition of compute units each comprising a plurality of physical computing components. The plurality of policies each can comprise operational triggers selected from among performance triggers, error triggers, and time triggers. Responsive to meeting criteria specified for the operational triggers, the plurality of policies indicate to management CPU 810 to add, remove, or alter one or more physical computing components from corresponding compute units. Management CPU 810 can also provide for creation of new machine policies or modification of existing machine policies. In one example, management CPU 801 can establish a user interface presenting an option for creation of a new policy that presents indications of one or more triggers and one or more actions responsive to the one or more triggers for inclusion in a new policy. The user interface can receive user selections among the one or more triggers and the one or more actions for inclusion in the new policy. Management CPU 801 can store a specification of the new policy for subsequent usage in adjusting composition of a compute unit after deployment of the compute unit.

Management CPU 810 can receive user instructions to establish a target compute unit based on a machine template and dynamic adjustment policies. The user interface can receive a user selection indicating a selected machine template among a plurality of machine templates to form a target compute unit. One a user selects a machine template for implementation into a compute unit, management CPU 810 allocates to the target compute unit a set of physical computing components according to the selected template. This allocation can include removing the physical computing components from a pool of free components for usage in the target compute unit.

In operation 912, management CPU 810 establishes the target compute unit based at least on logical partitioning within a communication fabric communicatively coupling the set of physical computing components of the target compute unit. The logical partitioning comprises one or more communication connections that are specified as connection arrangements made over one or more communication fabrics comprising one or more communication switch circuits. In one example, the communication connections are specified as logical partitioning arrangements made over one or more PCIe communication fabrics comprising one or more PCIe switch circuits. For example, management CPU 810 can establish logical domains the form compute units 890 or 891 within the associated communication fabrics. This may include allocating physical resources for compute unit 891 including CPU 867, storage device 868, and GPU 869 using a first logical domain. Likewise, this may include allocating physical resources for compute unit 890 including GPU 863, CPU 864, and storage device 865 using a second logical domain. Management CPU 810 may establish a logical domain for compute unit 891 across PCIe fabric 850 comprising communication switches 857. Management CPU 810 may establish a logical domain for compute unit 890 across PCIe fabric 850 comprising PCIe switches 851-852. A logical domain for compute unit 890 may employ conversion unit 811 when PCIe switch 852 employs a different protocol or PCIe version than PCIe switch 851 or PCIe fabric 850.

Management CPU 810 can further establish the target compute unit by deploying a software configuration to the target compute unit. This software configuration deployment might comprise storing the software configuration in an allocated storage device accessible by a host processor allocated to the target compute unit. With this stored software configuration, the host processor can boot into an associated operating system or other operational configuration. This software configuration deployment might comprise programming a programmable logic device (such as an FPGA) or storing the software configuration in an allocated storage device accessible by a programmable logic device allocated to the target compute unit. Management CPU 810 might deploy telemetry elements to the compute unit or interface with existing telemetry elements of the compute unit or communication fabric. For example, responsive to users deploying a target compute unit, management CPU 810 can deploy one or more telemetry elements to the target compute unit. The one or more telemetry elements can monitor operational properties of the target compute unit and provide the telemetry data to the management CPU 810 for use in dynamic adjustment of the target compute unit using one or more applicable policies.

In operation 913, CPU 864 (designated in this example as a host CPU) of the target compute unit boots into an operating system designated by a software configuration and begins to operate. The connected resources for the target compute unit appear to the host processor as native devices. Depending upon the fabric type and associated connections, these connected resources might be PCIe connected devices or connected by other fabrics. For example, an NVMe-over-fabric device can be employed using an IP stack to discover NVMe devices with NVMe-to-Ethernet driver on the host processor.

Continuing with further operation of the computing platform 800, management CPU 810 may perform operations 920. In operation 921, management CPU 810 may receive telemetry data regarding physical computing components or software operations of various compute units. This telemetry data can originate from host processors which execute monitoring software, such as telemetry elements, activity monitors, daemons, agents, and the like, and transfer telemetry data to management CPU 810. This telemetry data might arise from telemetry elements comprising IPMI elements for the compute unit or communication fabric. Other sideband monitoring circuitry and telemetry circuitry can also be employed and report telemetry to management CPU 810.

In operation 922, management CPU 810 analyzes the telemetry data and determines dynamic adjustments for one or more compute units based on applicable machine policies and results of the analysis. As discussed above, various triggers can be employed, such as performance-based, error-based, or time-based triggers, among others. The policies can not only set threshold levels or activity-based triggers for the telemetry data, but also actions to take in response to the triggers being satisfied. The actions can include alterations to the composition of existing compute units, addition of additional compute units to support a given application or workload, or removal of elements back into a free pool of elements.

In operation 923, management CPU 810 may then interface with the affected compute units or communication fabric circuitry to allocate new or additional resources, migrate workloads to other compute units, or migrate the compute unit to other physical computing components or fabric types. Management CPU 810 may alter the composition of the compute units by at least changing logical partitioning among the corresponding set of physical computing components to add, remove, or alter at least one among the set of physical computing components from the compute unit. Management CPU 810 may then reboot a processor component remaining in the set of physical computing components. In one example of operations 921-923, management CPU 810 may receive and analyze telemetry data from a target compute unit and determine that a processor utilization has exceeded a threshold for a specified period during a specified time of day. In response, management CPU 810 may cause the compute unit to migrate a workload to another processor with additional processing capability, or add an additional processor into the compute unit for workload sharing with an existing processor. The policy may further specify that during specified high utilization times of day, when utilization reaches a threshold and remains above that threshold for more than a minimum period of time, then a compute unit should be migrated to physical computing components coupled over a higher-performance communication fabric, such as Gen-Z or CXL instead of PCIe.

In another example of operations 911-923, management CPU 910 may present a compute unit creation interface to a user and receive a template selection for a real time data analysis compute unit. The dynamic adjustment policy set may specify that in general operation, a compute unit may be formed using physical components utilizing PCIe version 3.0, 4.0 or 5.0 (e.g. where PCIe sub-fabrics 805 and 806 utilize PCIe versions 3.0 and 4.0, respectively). The policies may further specify that during specified high utilization times of day, when utilization reaches a threshold and remains above that threshold for more than a minimum period of time, the compute unit should be migrated to the higher performance physical components of assembly 803. In response to the template and policies, management CPU 810 may initially allocate host CPU 864, GPU 863, storage unit 865 to target compute unit 890 coupled over a logical domain. The target compute unit may then initialize and being operating. In response to the aforementioned policy being triggered, management CPU 810 may migrate compute unit 890 to compute unit 891 that includes host CPU 867, GPU 869, and storage unit 868 coupled over a logical domain in the sub-fabric 807.

Figure 10:
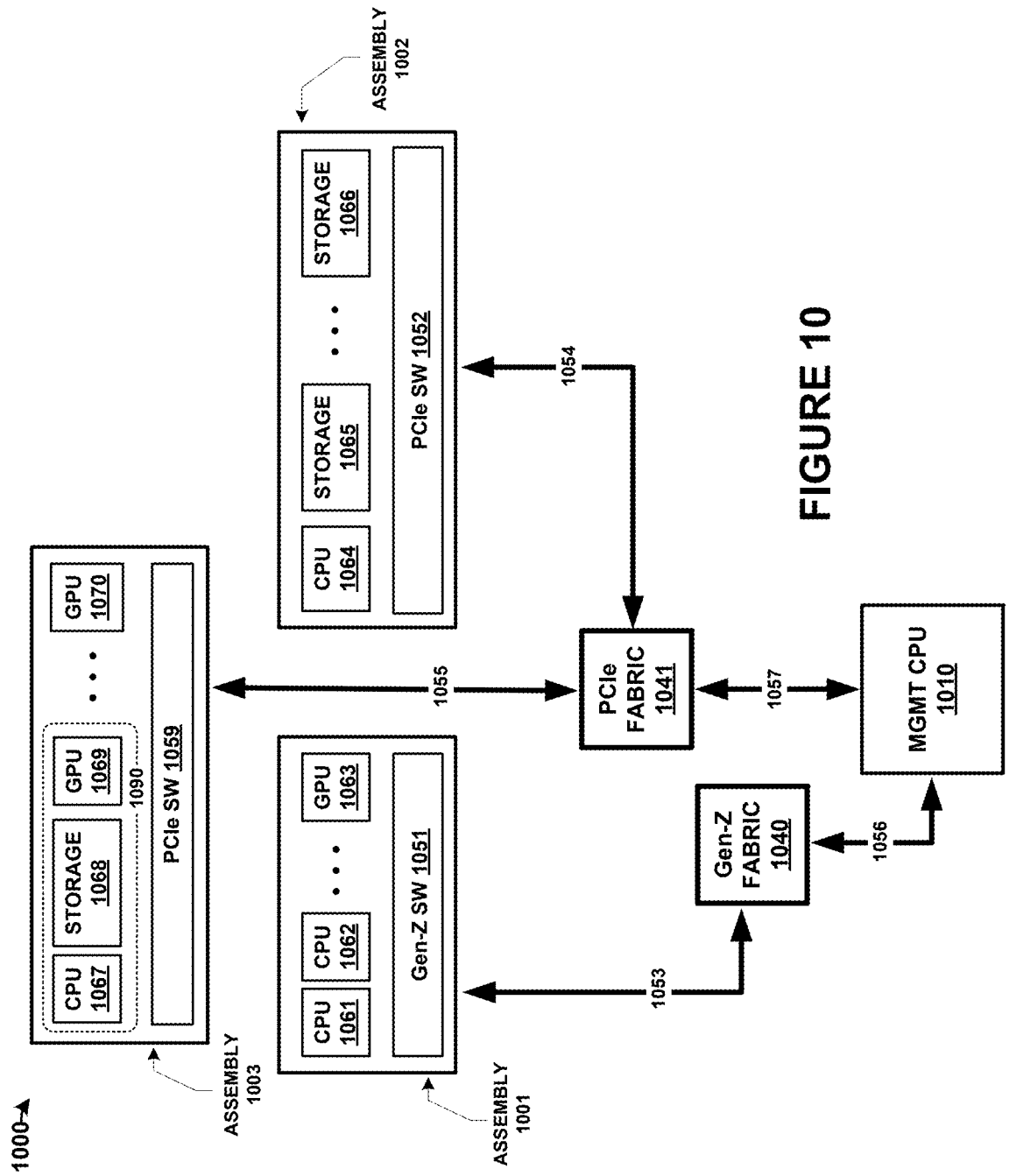
FIG. 10 is a diagram illustrating components of a computing platform in an implementation.

FIG. 10 is presented to illustrate a further example of the operation of the processes discussed herein in the context of a computing platform which segregates devices based on communication protocol into separate fabrics managed by the same management CPU. In FIG. 10, computing platform 1000 is presented. Computing platform 1000 includes management CPU 1010, Gen-Z fabric 1040 and PCIe fabric 1041, which include assemblies 1001-1003, respectively, that house a plurality of associated CPUs, GPUs, and storage devices, as well as a PCIe switches 1052 and 1059 and Gen-Z switch 1051. Assemblies 1001-1003 might comprise any chassis, rackmount or "just a box of disks" (JBOD) or "just a bunch of logic" (JBOL) assemblies. In the current example, assembly 1001 utilizes a first communication protocol (i.e. Gen-Z) in Gen-Z fabric 1040, while assembly 1002 and assembly 1003 utilize a second communication protocol (e.g. PCIe), in PCIe fabric 1041. A number of PCIe and Gen-Z links interconnect the elements of FIG. 10, namely PCIe links 1054-1057. In some examples, links 1056 and 1057 may comprise special control/management links that enables administrative or management-level access of control to fabrics 1040-1041 in addition to data/communication links. In other examples, management CPU 1010 may interface with Gen-Z fabric 1040 utilizing the first communication protocol (e.g. Gen-Z) over link 1056 and may interface with PCIe fabric 1041 utilizing the second communication protocol (e.g. PCIe) over PCIe link 1057.

As shown, each protocol is managed a separate communication "fabric" by management CPU 1010. Although examples herein are discussed in terms of segregating fabrics by protocol, implementations are not so limited. In some implementations, other parameters, such as types of interconnects or physical isolation of groups of devices in the disaggregated computing platform may be used to segregate devices. For example, management CPU 1010 may be coupled to two groups of PCIe switches and devices which are communicatively isolated from one another (except through the management CPU). Management CPU 1010 may segregate the isolated groups into separate PCIe fabrics, regardless of the protocol utilized by the devices within each group.

Turning to example operations of computing platform 1000, management CPU 1010 may establish compute units. Management CPU 1010 may present a compute unit creation interface to a user and receive user instructions to establish a compute unit based on a template and dynamic adjustment policies or by manual user selection. Management CPU 1010 may establish a logical domain for target compute unit 1090. This may include allocating physical resources for the target compute unit including host CPU 1067, GPU 1069, and storage unit 1068. Management CPU 1010 may then establish the logical domain for the allocated physical resources of the target compute unit including host CPU 1067, GPU 1069, and storage unit 1068. Management CPU 1010 can deploy software to host CPU 1067 of the target compute unit, which can then boot and begin to operate.

Management CPU 1010 may present a compute unit creation interface to a user and receive a template selection for a real time data analysis compute unit. The dynamic adjustment policy set may specify that a compute unit may be formed using physical components utilizing PCIe version 3.0, 4.0 or 5.0 (e.g. where PCIe fabric 1040 utilizes Gen-Z and PCIe fabric 1041 utilizes PCIe version 4.0, respectively). In response to the template and policies, management CPU 1010 may allocate host processor 1067, GPU 1069, and storage unit 1068 to a compute unit 1090 sharing a logical domain. The compute unit may then initialize and being operating. The policies may further specify that, when utilization reaches a threshold and remains above that threshold for more than a minimum period of time, the compute unit should be expanded to include additional GPUs or storage units. Management CPU 1010 may responsively add one or more GPUs or storage units into the compute unit, which might be included in the same assembly or a different assembly as other existing components of the compute units.

Management CPU 1010 may also receive telemetry from the various compute unit elements involved in communications of the compute unit. Management CPU 1010 may analyze the telemetry data and determine dynamic adjustments based on the dynamic adjustment policies and the analysis. Management CPU may then interface with the compute unit to allocate new or additional resources or migrate the compute unit to other devices. Management CPU 1010 may receive and analyze telemetry data from the compute unit and determine that the utilization has exceeded a threshold for the specified period. In response, management CPU 1010 may select an additional GPU or storage unit (e.g. GPU 1070 and storage unit 1066) from a pool of free elements on PCIe fabric 1041 and add the additional components to compute unit 1090.

Figure 11:
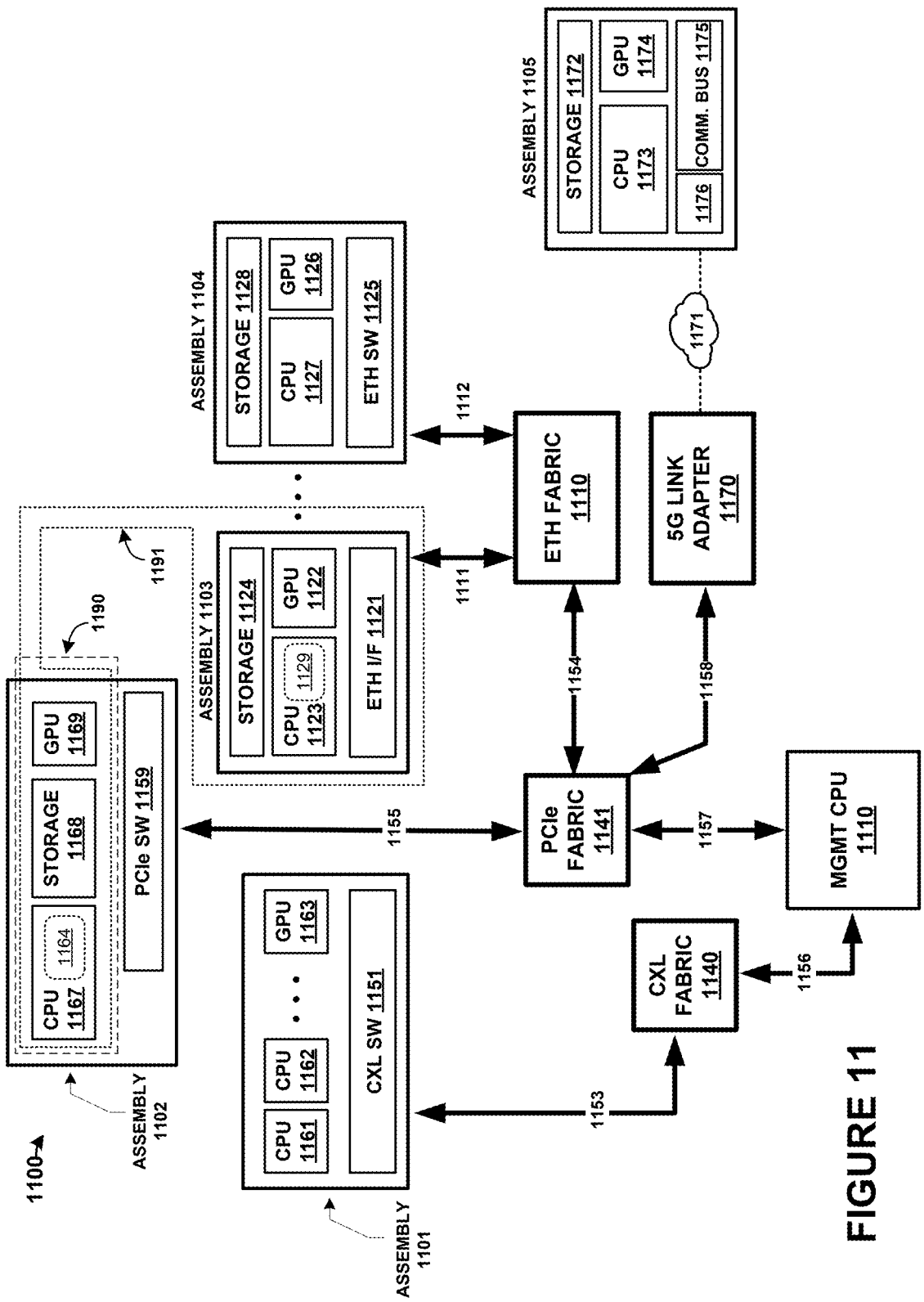
FIG. 11 is a diagram illustrating components of a computing platform in an implementation.

FIG. 11 is presented to illustrate an example of the operation of the processes discussed herein in the context of a computing platform which segregates devices based on communication protocol into separate fabrics managed by the same management CPU. In FIG. 11, computing platform 1100 is presented. Computing platform 1100 includes a management CPU 1110, Ethernet fabric 1110, Compute Express Link (CXL) fabric 1140, PCIe fabric 1141, 5G link adapter 1170, 5G network 1171, and assemblies 1101-1105. Assemblies 1101-1105 house a plurality of associated physical data storage and computing elements comprising CPUs, GPUs, and storage devices. Assembly 1101 includes CXL switch 1151, a plurality of CPUs 1161-1162, and one or more GPUs 1163. Assembly 1102 includes PCIe switch 1159, CPU 1167, storage system 1168, GPU 1169, and further ones of these elements (not shown in FIG. 11 for clarity). Assembly 1103 includes Ethernet interface 1121, CPU 1123, GPU 1122, and storage system 1124. Assembly 1104 includes Ethernet switch 1125, CPU 1126, GPU 1127, and storage system 1128. Assembly 1105 includes 5G interface 1176, communication switch 1175, CPU 1173, GPU 1174, and storage system 1172.

Assemblies 1101-1105 might comprise any chassis, server, computing assembly, rackmount assembly, JBOD, or JBOL assembly. Assemblies 1101-1105 might comprise one or more data centers. In the current example, assembly 1101 utilizes a first communication protocol (e.g. CXL) in CXL fabric 1140, assembly 1102 utilize a second communication protocol (e.g. PCIe), in PCIe fabric 1141, assemblies 1103-1104 utilize a third communication protocol (e.g. Ethernet) in Ethernet fabric 1110, and assembly 1105 utilizes a fourth communication protocol (e.g. 5G cellular wireless communication). A number of PCIe, Ethernet, and CXL links interconnect the elements of FIG. 11, namely links 1111, 1112, and 1153-1158. In some examples, links 1156 and 1157 may comprise special control/management links that enables administrative or management-level access of control to fabrics 1140-1141 in addition to data/communication links. In other examples, management CPU 1110 may interface with CXL fabric 1140 utilizing the first communication protocol (e.g. CXL) over link 1156 and may interface with PCIe fabric 1141 utilizing the second communication protocol (e.g. PCIe) over PCIe link 1157. Management CPU 1110 might interface with Ethernet fabric 1101 and 5G link adapter 1170 over associated links 1154 and 1158 which can each comprise a PCIe link, CXL link, or Ethernet link. Links 1111-1112 comprise Ethernet links, such as gigabit Ethernet or other forms of Ethernet including wired, wireless, Wi-Fi, or optical media.

As shown, each set of communication switches for a given protocol is managed by management CPU 1110 as a separate communication fabric. Although examples herein are discussed in terms of segregating fabrics by protocol, implementations are not so limited. In some implementations, other parameters, such as types of interconnects or physical isolation of groups of devices in the disaggregated computing platform may be used to segregate devices. For example, management CPU 1110 may be coupled to two groups of PCIe switches and devices which are communicatively isolated from one another (except through the management CPU). Management CPU 1110 may segregate the isolated groups into separate fabrics, regardless of the protocol utilized by the devices within each group.

Turning to operations of computing platform 1100, management CPU 1110 may establish compute units based on templates. Management CPU 1110 may present a compute unit creation interface to a user and receive user instructions to establish a compute unit based on a template and dynamic adjustment policies. Management CPU 1110 detects disaggregated physical elements and converged elements available over the various communication fabrics. For example, the physical elements might comprise disaggregated elements provided by assemblies 1101-1102 and converged elements provided by assemblies 1103-1105.

Management CPU 1110 can query or otherwise discover various physical elements and whether or not the elements are associated with other converged elements or comprise disaggregated elements. This might occur during power up of such devices or of management CPU 1110, during bus instantiation phases, or upon connection of various assemblies and components to their respective links/buses and subsequent power-up.

As referred to herein, disaggregated components or elements comprise discrete physical computing, processing, graphics, logic, or storage elements which are individually coupled to a point-to-point communication fabric, individually segregable, and can be arbitrarily segregated or are arbitrarily segregable into logical groupings. These logical groupings of disaggregated components can be established dynamically and according to instructions or control by management CPU 1110. For example, assembly 1101 or 1102 might have any of the included elements included in a free pool of elements which can be associated into compute units, and later released back into the free pool. In contrast, converged components or elements comprise elements which are more fixed in relationship to a host CPU or bus arrangement. Converged elements comprise computing systems that have a pre-configured set of physical elements. These computing systems can comprise more traditional computing systems, such as legacy servers, server computers, desktop computers, blade servers, mobile computing devices, and the like, which have a predetermined and relatively fixed coupling of physical elements to associated buses and have a dedicated CPU or CPUs. Changes in the physical configuration of physical elements of individual converged elements typically require an operator to manually add or remove physical elements into a chassis or to connect to different physical buses, although all converged elements are not limited to such arrangements. Thus, while disaggregated elements comprise physical components that can be arbitrarily and individually assigned to various fabric-coupled compute units according to logical partitioning of the fabric, converged elements typical have fixed component-to-bus relationships and component-to-component relationships and can only be handled in combined (converged) blocks. A converged assembly might include a set of components including a CPU, GPU, network interface, and storage system which are included in the same physical chassis and cannot be logically divorced from each other. Thus, all components of a converge set are typically added to a compute unit as a group, even if all portions of the converged set are not presently employed by the compute unit. A disaggregated assembly can have any arbitrary collection of physical elements which can be logically divorced from one another and associated with other physical elements through intelligent fabric control and logical domain-based groupings.

A user can indicate to management CPU 1110 to create one or more compute units. These compute units can be formed from elements in a free pool of physical elements or physical resources. The resources can include disaggregated elements from assemblies 1101-1102 or converged elements from assemblies 1103-1105. When a user instruction prompts management CPU 1110 to add disaggregated components into a compute unit, then management CPU 1110 can reconfigure an associated communication fabric to include only those relevant physical components in the compute unit. When a user instruction prompts management CPU 1110 to add converged components into a compute unit, then management CPU 1110 can deploy control software to the relevant converged components which in turn adds all corresponding physical components of the converged assembly or set (e.g. server) into the compute unit. Thus, while adding disaggregated elements into a compute unit might provide for fine-grained selection among physical resources for inclusion in a compute unit, converged elements might incidentally need to include other ancillary components (storage devices, CPUs, GPUs, etc . . . ) other than the specific physical resource needed for the compute unit.

Once these elements are added to the compute unit, then they are removed from the free pool of resources and assigned to the compute unit. Management CPU 1110 may establish a logical domain to establish compute unit 1190. Compute unit 1190 may include allocating physical resources for the compute unit including host CPU 1167, GPU 1169, and storage unit 1168. Management CPU 1110 may then establish the logical domain for the allocated physical resources of the compute unit including host CPU 1167, GPU 1169, and storage unit 1168. Software is deployed to the compute unit and host CPU 1167 of the compute unit boots and begins to operate.

Management CPU 1110 may present a compute unit creation interface to a user and receive a user selection for a compute unit. The user can specify requirements, such as storage, processing, network, graphics, and the like, and management CPU 1110 can determine an appropriate set of physical components that meet or exceed the requirements of the user. Furthermore, dynamic adjustment policy user instructions may specify that a compute unit can be altered when utilization reaches a threshold and remains above that threshold for more than a minimum period of time. For example, the compute unit could be automatically expanded by management CPU 1110 to include additional CPUs, network elements, GPUs, or storage units. In response to the compute unit creation instructions and associated policies, management CPU 1110 may allocate a set of physical resources into a compute unit or set of compute units that form a cluster. For example, management CPU 1110 might initially form compute unit 1190 to include disaggregated elements in a logical domain from assembly 1102 comprising CPU 1167, GPU 1169, and storage unit 1168, and later select converged elements from assembly 1103 comprising CPU 1123, GPU 1122, and storage unit 1124 for inclusion in the logical domain. FIG. 11 thus illustrates modified compute unit 1191 with such elements.

Management CPU 1110 deploys software to appropriate elements among compute unit 1191 and the compute unit may then initialize and being operating. Specifically, management CPU 1110 deploys control software 1129 to CPU 1123 of assembly 1103. This control software 1129 provides the physical resources of converged assembly 1103 into compute unit 1191 for use by the software of the compute unit. Control software 1129 can include various drivers, operating systems, applications, and other software elements. Control software 1129 can comprise a specialized portion to instantiate elements of assembly 1103 into the compute unit, assign network addressing properties, and direct Ethernet traffic for assembly 1103 to be associated with disaggregated elements 1167, 1168, and 1169 of assembly 1102 which reside on a PCIe fabric. Ethernet fabric 1110 might include Ethernet to PCIe interworking circuitry and software to provide for routing of Ethernet traffic of Ethernet interface 1121 to particular PCIe devices of a compute unit and vice versa. Also, management CPU 1110 can deploy software 1164 to CPU 1167 similarly as software 1129 to CPU 1123. CPU 1167, which comprises a disaggregated CPU, is dynamically associated with elements 1168 and 1169 using logical partitioning within the associated PCIe fabric, while CPU 1123 is a converged CPU and has a fixed relationship to elements 1122 and 1124. Thus, adding CPU 1123 into compute unit 1191 will also typically add elements 1122 and 1124, or at least tie-up elements 1122 and 1124 from usage with other compute units until CPU 1123 is released back into the free pool. In contrast, elements 1168 and 1169 might individually be placed back into the free pool, or other physical elements in assembly 1102 might be later included in the compute unit as needed.

Management CPU 1110 may receive telemetry from the various compute unit elements involved in communications of compute unit 1191. Management CPU 1110 may analyze the telemetry data and determine dynamic adjustments based on the dynamic adjustment policies and the analysis. Management CPU may then interface with compute unit 1191 to allocate new or additional resources or migrate the compute unit to other devices. Management CPU 1110 may receive and analyze telemetry data from compute unit 1191 and determine that the utilization has exceeded the threshold for the specified period. In response, management CPU 1110 may select an additional GPU or storage unit from the pool of free elements and add the additional components to compute unit 1191 by altering the logical domain of the associated communication fabrics.

Turning now to a further communication protocol example, a 5G cellular wireless network might be employed for a portion of the communication links between converged or disaggregated components, data centers, sites, or other elements. Cellular wireless technologies might include various wireless protocols and networks built around the 3rd Generation Partnership Project (3GPP) standards including 4G Long-Term Evolution (LTE), 5G NR (New Radio) and related 5G standards, among others. In FIG. 11, a 5G standard is employed, but other wireless communication protocols can be used instead or in combination. 5G network 1171 comprises one or more base stations, radio towers, network routers, RF transceiver equipment, and the like, to transfer communications over a cellular wireless communication network between endpoints. In FIG. 11, one endpoint comprises 5G link adapter 1170 which might comprise a radio, RF transceiver elements, antenna arrays, power amplifiers, multiple-input multiple-output (MIMO) circuitry and antenna elements, buffers, and various radio control circuitry. 5G link adapter 1170 communicates with 5G network 1171 over one or more RF links, and interworks the 5G communications with a second communication interface to communicate over link 1158 with PCIe fabric 1141. The second communication interface might comprise PCIe, CXL, Ethernet, or other links. Once coupled to PCIe fabric 1151, 5G link adapter 1170 can provide access for management CPU 110 to assembly 1105 over 5G network 1171 and access for other elements of FIG. 11 to communicate with elements of assembly 1105. 5G link adapter 1170 communicatively couples into a PCIe fabric (or other communication fabric) the one or more assemblies or systems that are coupled into a 5G network. Management CPU 1110 can create compute units from among the elements of assembly 1105, add such elements into a pool of free components for use in compute units, and establish logical domains that encompass elements of assembly 1105. When assembly 1105 comprises a converged system or server, then management CPU 1110 might bring elements as a set into and out of the free pool. Assembly 1105 also includes 5G interface 1176 which comprises similar elements as 5G link adapter 1170. 5G interface 1176 might convert communications between 5G network links and a local communication bus (such as a PCIe bus) of assembly 1105 provided by communication bus 1175.

Figure 12:
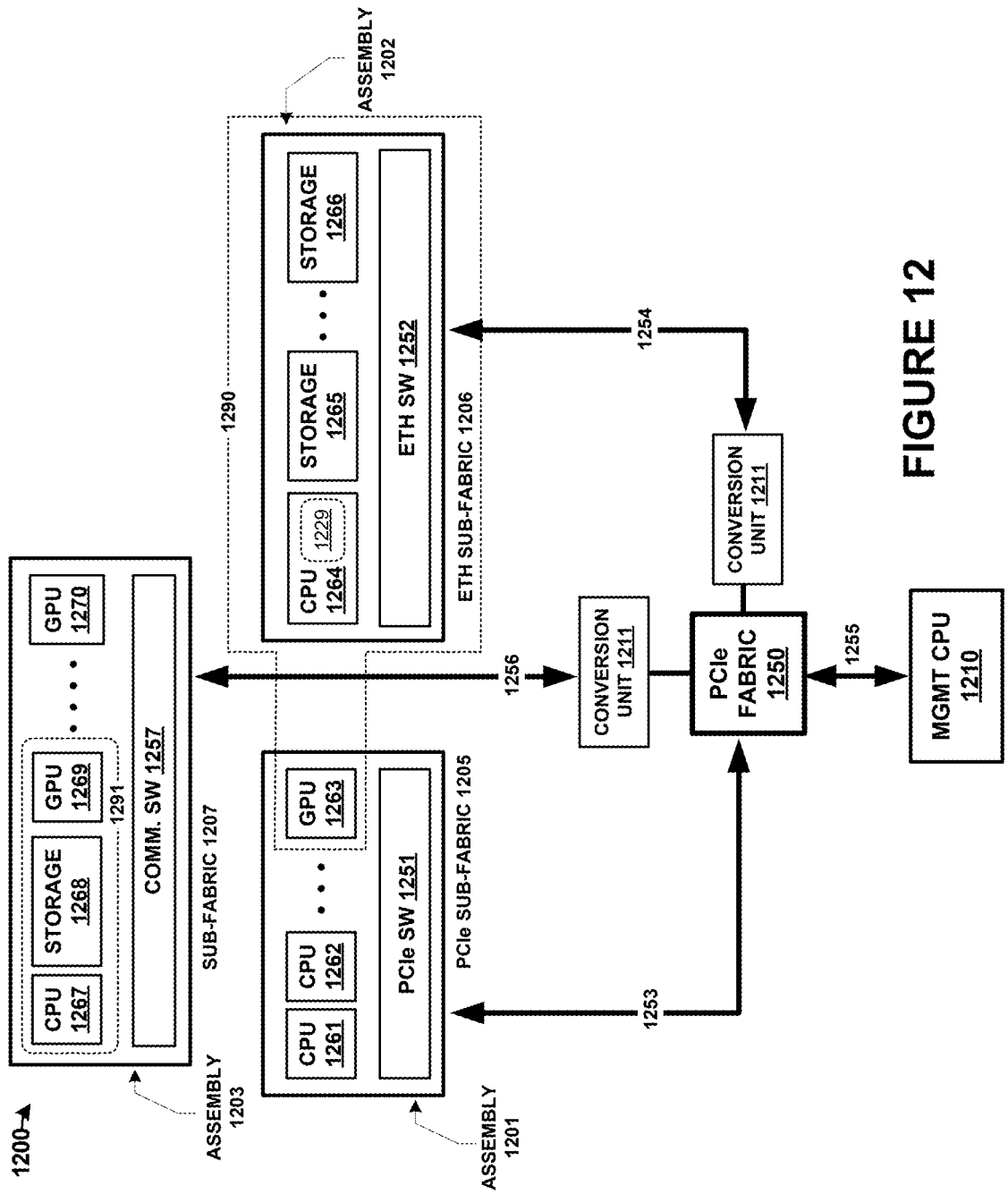
FIG. 12 is a diagram illustrating components of a computing platform in an implementation.

FIG. 12 is presented to illustrate example operations in the context of a computing platform that includes cross protocol communication. In FIG. 12, computing platform 1200 is presented. Computing platform 1200 includes a management CPU 1210, PCIe fabric 1250, as well assemblies 1201-1203 that house a plurality of associated CPUs, GPUs and storage devices 1261-1270, as well as PCIe switch 1251, Ethernet switch 1252, and communication switch 1257. Assemblies 1201-1203 might comprise any chassis, rackmount, or JBOD/JBOL assemblies. In the current example, assembly 1201 comprises a disaggregated assembly that utilizes a first communication protocol (i.e. PCIe) and associated PCIe version in a first PCIe sub-fabric 1205, assembly 1202 comprises a converged assembly that utilizes a second communication protocol (i.e. Ethernet) and associated Ethernet version in a second Ethernet sub-fabric 1206 and assembly 1203 utilizes a third communication protocol (i.e. Gen-Z, CXL, among others) or a different version of the PCIe protocol in a third sub-fabric 1207. In some examples, PCIe fabric 1250 may utilize the first communication protocol and associated PCIe version. A number of links interconnect the elements of FIG. 12, namely PCIe links 1253 and 1255, Ethernet link 1254, and communication link 1256. In some examples, PCIe link 1255 may comprise a special control/management link that enables administrative or management-level access of control to PCIe fabric 1250 in addition to data/communication links.

Each communication protocol can be segregated into a corresponding "sub-fabric" entity coupled through a possible conversion elements 1211-1212 to PCIe fabric 1250. The conversion units may couple via compatible cabling/connectors to a fabric control box (top of rack switch) within PCIe fabric 1250 which can interface to each individual sub-fabric or box over the associated protocol/link, and then interwork/convert traffic among them. Conversion units 1211-1212 may operate to act as interfaces between devices utilizing the different versions or communication protocols. Data transfers detected may be "trapped" and translated or converted to the version or communication protocol utilized by the destination device by the conversion unit circuitry and then routed to the destination device. More particularly, conversion unit 1211 may convert the Ethernet communication protocol to the PCIe communication protocol, and vice versa. Similarly, conversion unit 1211 may convert Gen-Z, CXL, or other communication protocols to the PCIe communication protocol, and vice versa. Packet headers can be stripped from data payloads received using a first protocol, and those data payloads can be re-packetized or re-framed for transfer using a destination protocol.

Turning to operations of computing platform 1200, management CPU 1210 may establish a compute unit. Management CPU 1210 may present a compute unit creation interface to a user and receive user instructions to establish a compute unit, which might be based on predetermined hardware templates and include dynamic adjustment policies. Management CPU 1210 may establish a logical domain for compute unit 1290. This may include allocating physical resources for the compute unit including both disaggregated and converged physical resources. In one example for compute unit 1290, management CPU 1210 can include disaggregated physical resource GPU 1263 into compute unit 1290. GPU 1263 can communicate via PCIe switch 1251 and PCIe link 1253 to PCIe fabric 1250. Management CPU 1210 can also include converged physical resource assembly 1202 into compute unit 1290. Assembly 1202 can communicate via Ethernet switch 1252, Ethernet link 1254, and Ethernet-to-PCIe conversion unit 1212 to PCIe fabric 1250. Once formed, compute unit 1290 includes GPU 1263, CPU 1264, and storage units 1265-1266. Management CPU 1210 may then establish a logical domain for the allocated physical resources of compute unit 1290. Software is deployed to the compute unit and host CPU 1264 of the compute unit boots and begins to operate.

Management CPU 1210 may present a compute unit creation interface to a user and receive a user selection for a compute unit. The user can specify requirements, such as storage, processing, network, graphics, and the like, and management CPU 1210 can determine an appropriate set of physical components that meet or exceed the requirements of the user. Furthermore, dynamic adjustment policy user instructions may specify that a compute unit can be altered when utilization reaches a threshold and remains above that threshold for more than a minimum period of time. For example, the compute unit could be automatically expanded by management CPU 1210 to include additional CPUs, network elements, GPUs, or storage units. In response to the compute unit creation instructions and associated policies, management CPU 1210 may allocate a set of physical resources into a compute unit or set of compute units that form a cluster. For example, management CPU 1210 might select disaggregated elements from assembly 1201 comprising GPU 1263, and select converged elements from assembly 1203 comprising CPU 1264 and storage units 1265-1266. FIG. 12 shows compute unit 1290 comprising such elements.

Management CPU 1210 deploys software to appropriate elements among compute unit 1290 and the compute unit may then initialize and being operating. Specifically, management CPU 1210 deploys control software 1229 to CPU 1264 of assembly 1202. This control software 1229 provides the physical resources of converged assembly 1202 into compute unit 1290 for use by the software of the compute unit. Control software 1229 can include various drivers, operating systems, applications, and other software elements. Control software 1229 can comprise a specialized portion to instantiate elements of assembly 1202 into the compute unit, assign network addressing properties, and direct Ethernet traffic for assembly 1202 to be associated with disaggregated element 1263 of assembly 1201 which reside on a PCIe fabric. Ethernet sub-fabric 1206 and conversion unit 1212 might include Ethernet to PCIe interworking circuitry and software to provide for routing of Ethernet traffic of Ethernet switch 1252 to particular PCIe devices of a compute unit and vice versa. GPU 1263, which comprises a disaggregated GPU, is dynamically associated the compute unit using logical partitioning within the associated PCIe fabric, while CPU 1264 is a converged CPU and has a fixed relationship to elements 1265 and 1266. Thus, adding CPU 1264 into the compute unit will also typically add elements 1265 and 1266, or at least tie-up elements 1265 and 1266 from usage with other compute units until CPU 1264 is released back into the free pool. In contrast, element 1263 might individually be placed back into the free pool, or other physical elements in assembly 1201 might be later included in the compute unit as needed.

Management CPU 1210 may receive telemetry from the various compute unit elements involved in communications of the compute unit. Management CPU 1210 may analyze the telemetry data and determine dynamic adjustments based on the dynamic adjustment policies and the analysis. Management CPU may then interface with the compute unit to allocate new or additional resources or migrate the compute unit to other devices. Management CPU 1210 may receive and analyze telemetry data from the compute unit and determine that the utilization has exceeded the threshold for the specified period during the specified time of day. In response, management CPU 1210 may cause the compute unit to migrate to host CPU 1267, GPU 1269, and storage unit 1268 to compute unit 1291 of the compute unit in sub-fabric 1207.

Figure 13:
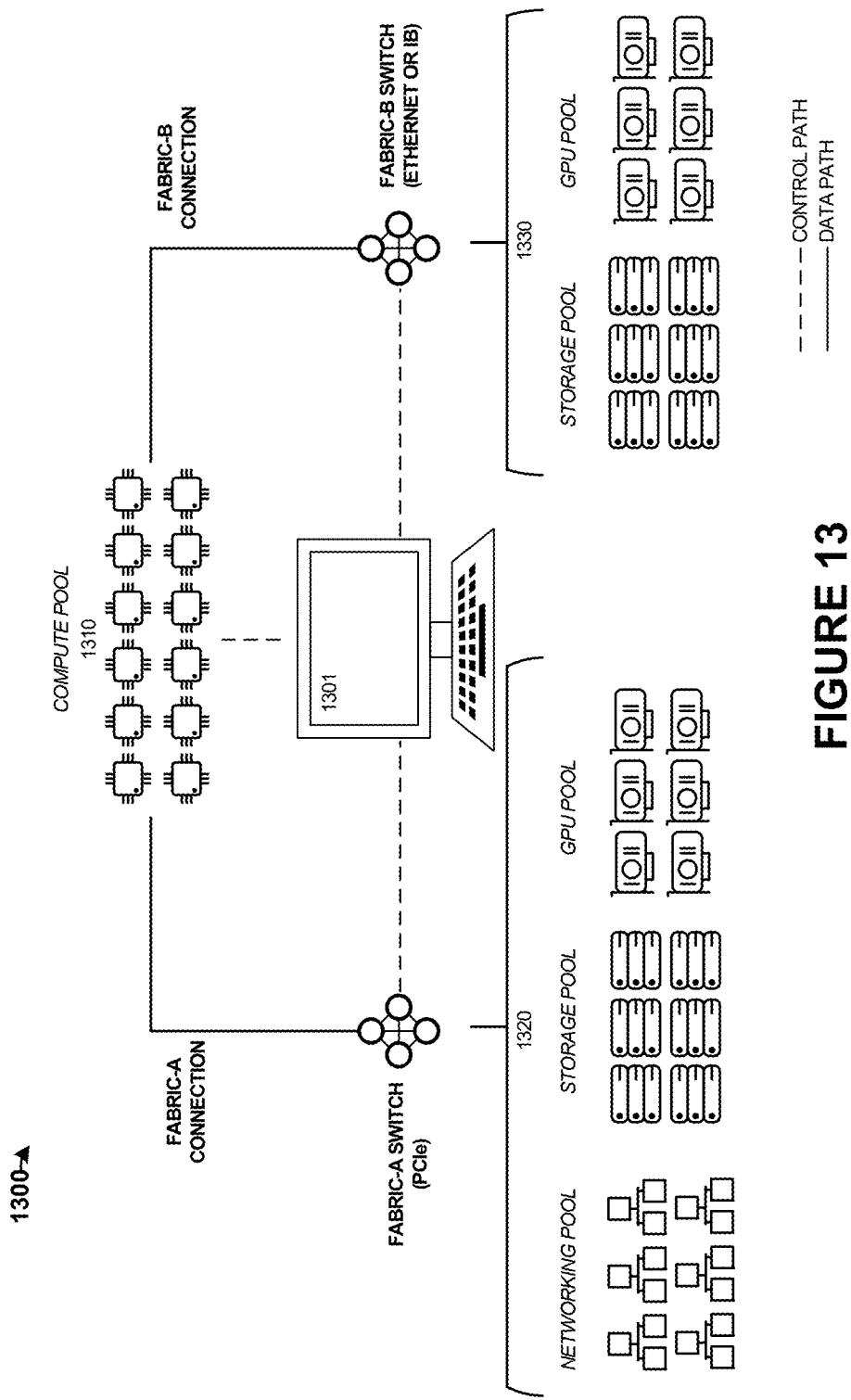
FIG. 13 illustrates example multi-fabric cluster management implementations.

FIG. 13 illustrates example multi-fabric cluster management implementations. Environment 1300 illustrates unified multi-fabric support for data storage and computing. In FIG. 13, compute pool 1310 is shown as being a pool of free computing resources able to be assigned into one or more compute units according to user control or dynamic policy-based control. A first set 1320 of physical resources available for the compute pool (left side of the Figure) comprise a network pool, storage pool, and GPU pool, among other physical resources that are coupled over a first fabric type A, namely a PCIe communication fabric. A second set 1330 of physical resources available for the compute pool (right side of the Figure) comprise a storage pool and a GPU pool, among other physical resources that a coupled over a second fabric type B, namely an Ethernet or InfiniBand communication fabric. Various data and control pathways are shown for control of the various fabrics and exchange of data among the compute units and physical elements. Advantageously, this configuration of FIG. 13 enables cross-composability of compute units across multiple fabric types. For example, the cross-composability can form compute units that span over a first fabric type A, namely the PCIe communication fabric and a second fabric type B, namely the Ethernet or InfiniBand communication fabric, among other fabric types. Management console 1301 can provide user interfaces and control systems for establishing compute units, policies, templates, and other cluster activities.

Figure 14:
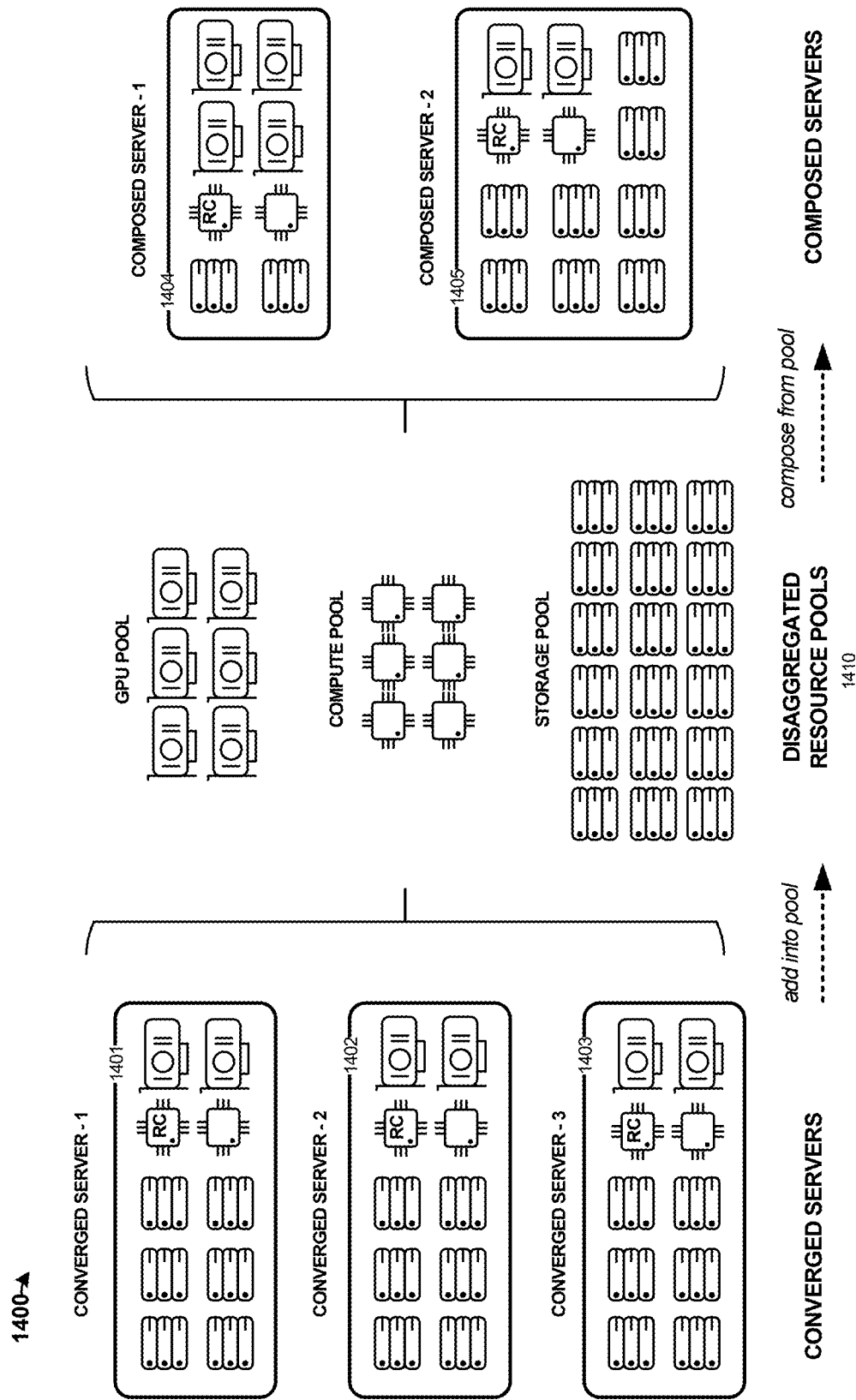
FIG. 14 illustrates example converged server disaggregation implementations.

FIG. 14 illustrates example multi-fabric cluster management implementations. Arrangement 1400 of FIG. 14 shows converged servers 1401-1403 able to be disaggregated into a free pool of physical resources for inclusion in various user-configurable compute units (composed servers). A converged server has a predetermined arrangement of physical resources that typically cannot be broken apart into individual elements in a disaggregated pool, but entire converged servers can nonetheless be characterized according to the physical elements they comprise and these physical elements can be represented in free pool 1410 of disaggregated resources, along with true disaggregated physical resources. Elements from this free pool can then be included into one or more composed servers which are configured dynamically and as needed.

FIG. 14 illustrates example multi-fabric cluster management implementations. In FIG. 14, software disaggregation of converged servers is described. Converged servers 1401-1403 are characterized for available physical resources, and included in free pool 1410 of resources which might be alongside disaggregated components to form composed servers 1404-1405. In this manner, converged resources can achieve a disaggregated-like property by being placed into free pools of resources. Once compute units are needed to be formed among the converged servers 1401-1403 and other disaggregated resources to form composed servers 1404-1405, software is deployed to the selected converged servers and disaggregated resources to instantiate such selected converged servers into compute units. In FIG. 14, physical resources of converged servers 1401-1403 are included into disaggregated resource pool 1410 of physical resources that might comprise CPUs, CPUs, storage units (e.g. SSDs), and other physical resources. Compute units can be formed by selecting components from free pool 1410 and logically associating the physical resources into individual compute units as described herein and shown for composed servers 1404-1405.

Typically, each converged server and each composed server will only have one root complex entity, such as a PCIe root complex or other interface type root complex, which interfaces with the associated communication fabric. In FIG. 14, these root complexes are labeled as 'RC' and are associated with a single processor device among each of the various servers. When PCIe is employed, the root complex can interface with many 'endpoints' or devices such as storage devices, GPUs, NICs, FPGAs, or other CPUs that include endpoint functionality. When more than one CPU is included in a server (e.g. converged, composed machine, or composed compute unit), then a first CPU can be designated as the root complex while other CPUs can be designated as endpoints. The designation can change according to operational needs of the server, which might be tied to a policy or template.

Advantageously, deployments of compute units can be based on independent disaggregated pools, and deployments can enable disaggregation of converged servers. Control software packages can be deployed to converged servers to enable new disaggregation features. The software can be deployed on existing and new hardware deployments, enabling additional usage on server equipment of existing data centers, and converting existing converged servers to composable servers.

The functional block diagrams, operational scenarios and sequences, and flow diagrams provided in the FIGS. are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method comprising:
receiving a user command to form a compute unit from among a pool of computing components, the pool of computing components comprising first computing components communicatively coupled to a first communication fabric that conforms to a first communication fabric protocol and second computing components communicatively coupled to a second communication fabric that conforms to a second communication fabric protocol different than the first communication fabric protocol;
initiating a conversion unit to interwork communications for the compute unit among a first selected computing component communicating with the first communication fabric protocol and a second selected computing component communicating with the second communication fabric protocol; and
based at least on a policy affecting the compute unit, migrating a workload for the compute unit by at least adding, into the compute unit, an additional computing component that uses the second communication fabric protocol and removing, from the compute unit, the first selected computing component that uses the first communication fabric protocol.

2. The method of claim 1, further comprising:
presenting at least the first computing component and the second computing component in a control interface as a shared pool of computing components available to compose into arbitrary compute units having computing components selected from both the first communication fabric and the second communication fabric; and
receiving the user command via the control interface.

3. The method of claim 1, further comprising:
forming a first logical partition in the first communication fabric to include the first selected computing component and a second logical partition in the second communication fabric to include the second selected computing component to form the compute unit as having a logical domain spanning the first logical partition and the second logical partition.

4. The method of claim 1, wherein the conversion unit is configured to interwork different ones among communication fabric types, communication protocol types, or communication protocol versions among selected computing components of the compute unit.

5. The method of claim 1, further comprising:
based at least on a first configuration inhibiting spanning across different communication fabric types, indicating to a user that at least one of the computing components of the pool of computing components cannot be included among the selected computing components;
based at least on a second configuration allowing spanning across different communication fabric types, indicating to the user that at least another of the computing components of the pool of computing components can be included among the selected computing components.

6. The method of claim 1, wherein the first communication fabric comprises a communication fabric conforming to at least one among a Peripheral Component Interconnect Express (PCIe) and a Compute Express Link (CXL) communication protocol standard; and wherein the second communication fabric comprises a communication fabric conforming to at least one among a Gen-Z, InfiniBand, NVMe, Ethernet, Serial Attached SCSI (SAS), FibreChannel, Thunderbolt, Serial Attached ATA Express (SATA Express), Compute Express Link (CXL), Cache Coherent Interconnect for Accelerators (CCIX), Open Coherent Accelerator Processor Interface (OpenCAPI), Wi-Fi, cellular wireless communication fabric, and different version of PCIe fabric than the first communication fabric.

7. The method of claim 1, wherein a management processor is communicatively coupled to the first communication fabric, and wherein the management processor is configured to communicate over the second communication fabric via the first communication fabric.

8. The method of claim 1, comprising:
based at least on the user command, forming the compute unit by at least forming a logical domain that spans the first communication fabric and the second communication fabric and includes selected computing components.

9. The method of claim 1, further comprising:
performing a discovery process to identify the first computing components as associated with the first communication fabric protocol, and identify the second computing components as associated with the second communication fabric protocol; and
maintaining one or more data structures which indicate a communication fabric protocol for each of the first computing components and each of the second computing components.

10. The method of claim 1, wherein the first communication fabric protocol and the second communication fabric protocol each comprise a different protocol type or different protocol version conforming to at least one among a Peripheral Component Interconnect Express (PCIe), Gen-Z, InfiniBand, NVMe, Ethernet, Serial Attached SCSI (SAS), FibreChannel, Thunderbolt, Serial Attached ATA Express (SATA Express), Compute Express Link (CXL), Cache Coherent Interconnect for Accelerators (CCIX), Open Coherent Accelerator Processor Interface (OpenCAPI) Wi-Fi, and cellular wireless communication fabric.

11. An apparatus, comprising:
one or more computer readable storage media; and
program instructions stored on the one or more computer readable storage media that, based on being read and executed by a processing system, direct the processing system to at least:
receive a user command to form a compute unit from among a pool of computing components, the pool of computing components comprising first computing components communicatively coupled to a first communication fabric that conforms to a first communication fabric protocol and second computing components communicatively coupled to a second communication fabric that conforms to a second communication fabric protocol different than the first communication fabric protocol;
initiate a conversion unit to interwork communications for the compute unit among a first selected computing component communicating with the first communication fabric protocol and a second selected computing component communicating with the second communication fabric protocol; and
based at least on a policy affecting the compute unit, migrate workload for the compute unit by at least adding, into the compute unit, an additional computing component that uses the second communication fabric protocol and removing, from the compute unit, the first selected computing component that uses the first communication fabric protocol.

12. The apparatus of claim 11, wherein the conversion unit is configured to interwork different ones among communication fabric types, communication protocol types, or communication protocol versions among selected computing components of the compute unit.

13. The apparatus of claim 11, comprising further program instructions, based on being executed by the processing system, direct the processing system to at least:
based at least on a first configuration inhibiting spanning across different communication fabric types, indicate to a user that at least one of the computing components of the pool of computing components cannot be included among the selected computing components;
based at least on a second configuration allowing spanning across different communication fabric types, indicate to the user that at least another of the computing components of the pool of computing components can be included among the selected computing components.

14. The apparatus of claim 11, wherein the first communication fabric comprises a communication fabric conforming to at least one among a Peripheral Component Interconnect Express (PCIe) and a Compute Express Link (CXL) communication protocol standard; and
wherein the second communication fabric comprises a communication fabric conforming to at least one among a Gen-Z, InfiniBand, NVMe, Ethernet, Serial Attached SCSI (SAS), FibreChannel, Thunderbolt, Serial Attached ATA Express (SATA Express), Compute Express Link (CXL), Cache Coherent Interconnect for Accelerators (CCIX), Open Coherent Accelerator Processor Interface (OpenCAPI), Wi-Fi, cellular wireless communication fabric, and different version of PCIe fabric than the first communication fabric.

15. The apparatus of claim 11, comprising further program instructions, based on being executed by the processing system, direct the processing system to at least:
based at least on the user command, form the compute unit by at least forming a logical domain that spans the first communication fabric and the second communication fabric and includes selected computing components.

16. The apparatus of claim 11, comprising further program instructions, based on being executed by the processing system, direct the processing system to at least:
perform a discovery process to identify the first computing components as associated with the first communication fabric protocol, and identify the second computing components as associated with the second communication fabric protocol; and
maintain one or more data structures which indicate a communication fabric protocol for each of the first computing components and each of the second computing components.

17. The apparatus of claim 11, wherein the first communication fabric protocol and the second communication fabric protocol each comprise a different protocol type or different protocol version conforming to at least one among a Peripheral Component Interconnect Express (PCIe), Gen-Z, InfiniBand, NVMe, Ethernet, Serial Attached SCSI (SAS), FibreChannel, Thunderbolt, Serial Attached ATA Express (SATA Express), Compute Express Link (CXL), Cache Coherent Interconnect for Accelerators (CCIX), Open Coherent Accelerator Processor Interface (OpenCAPI), Wi-Fi, and cellular wireless communication fabric.

18. A computing system, comprising:
a user interface configured to receive a user command to form a compute unit from among a pool of computing components, the pool of computing components comprising first computing components communicatively coupled to a first communication fabric that conforms to a first communication fabric protocol and second computing components communicatively coupled to a second communication fabric that conforms to a second communication fabric protocol different than the first communication fabric protocol; and
a management processor configured to enable a conversion unit to interwork communications for the compute unit among a first selected computing component communicating with the first communication fabric protocol and a second selected computing component communicating with the second communication fabric protocol; and
based at least on a policy affecting the compute unit, the management processor configured to migrate a workload for the compute unit by at least adding, into the compute unit, an additional computing component that uses the second communication fabric protocol and removing, from the compute unit, the first selected computing component that uses the first communication fabric protocol.

19. The computing system of claim 18, comprising:
based at least on the user command, the management processor configured to form the compute unit by at least forming a logical domain that spans the first communication fabric and the second communication fabric and includes selected computing components.

20. The computing system of claim 18, wherein the first communication fabric protocol and the second communication fabric protocol each comprise a different protocol type or different protocol version conforming to at least one among a Peripheral Component Interconnect Express (PCIe), Gen-Z, InfiniBand, NVMe, Ethernet, Serial Attached SCSI (SAS), FibreChannel, Thunderbolt, Serial Attached ATA Express (SATA Express), Compute Express Link (CXL), Cache Coherent Interconnect for Accelerators (CCIX), and Open Coherent Accelerator Processor Interface (OpenCAPI), Wi-Fi, and cellular wireless communication fabric.

\* \* \* \* \*